(12) United States Patent  
Fukasawa

(10) Patent No.: US 7,617,505 B2  
(45) Date of Patent: Nov. 10, 2009

(54) OPTICAL DISK DEVICE

(75) Inventor: Akihiro Fukasawa, Kyoto (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 690 days.

(21) Appl. No.: 10/574,692

(22) PCT Filed: Jun. 3, 2004

(86) PCT No.: PCT/JP2004/007689

§ 371 (c)(1),  
(2), (4) Date: Apr. 5, 2006

(87) PCT Pub. No.: WO2005/057572

PCT Pub. Date: Jun. 23, 2005

(65) Prior Publication Data

US 2008/0028418 A1    Jan. 31, 2008

(30) Foreign Application Priority Data

Dec. 10, 2003 (JP) .............................. 2003-411130

(51) Int. Cl.  
*G11B 17/03* (2006.01)
(52) U.S. Cl. .................................................... 720/608
(58) Field of Classification Search ................ 720/608, 720/607, 661, 601, 619, 604, 623, 614, 605  
See application file for complete search history.

(56) References Cited

U.S. PATENT DOCUMENTS 5,995,468 A * 11/1999 Furukawa ................... 720/607

| 6,005,833 | A  | * | 12/1999 | Yasuma et al. ............... 720/602 |
| 7,408,743 | B1 | * | 8/2008  | McCaslin et al. ......... 360/244.8 |
| 7,502,203 | B1 | * | 3/2009  | McCaslin et al. ......... 360/244.5 |
| 7,503,054 | B2 | * | 3/2009  | Fukasawa .................... 720/608 |
| 2001/0030926 | A1 |   | 10/2001 | Tanaka et al. |
| 2003/0193874 | A1 |   | 10/2003 | Ariyoshi et al. |
| 2004/0136311 | A1 | * | 7/2004  | Nakamura et al. .......... 369/176 |
| 2004/0244015 | A1 | * | 12/2004 | Sekiguchi et al. ............ 720/601 |
| 2006/0072384 | A1 | * | 4/2006  | Fukasawa ................. 369/44.14 |

FOREIGN PATENT DOCUMENTS

| EP | 0 869 493 A2 | 10/1998 |
| EP | 1 569 217 A1 | 8/2005 |
| JP | 4-111266 A   | 4/1992 |

(Continued)

*Primary Examiner*—Allen T Cao  
(74) *Attorney, Agent, or Firm*—Birch, Stewart, Kolasch & Birch, LLP

(57) ABSTRACT

An optical disk device (1) includes a feed gear (64) that engages a rack portion (57*a*) integrally formed with an optical pickup (57), a tray gear (13) used for vertically moving a turntable (52) and moving a disk tray (12), and a motor (62) as a common driving source. The number of teeth of the feed gear (64) is the same as the number of teeth of the tray gear (13), and the rotation is transmitted from the feed gear (64) to the tray gear (13) so that the ratio of the number of rotations of the feed gear (64) to the number of rotations of the tray gear (13) is 1:1. With such an arrangement, it becomes possible to perform a pickup feeding operation, a turntable vertically-moving operation, and a disk carrying operation by one driving source, and it becomes possible to enhance ease of assembly.

6 Claims, 18 Drawing Sheets

FOREIGN PATENT DOCUMENTS

| | | |
|---|---|---|
| JP | 2680727 B2 | 8/1997 |
| JP | 11-30930 A | 2/1999 |
| JP | 2000-11511 A | 1/2000 |
| JP | 2000-264131 A | 9/2000 |
| JP | 2001-161694 A | 6/2001 |
| JP | 2002-93013 A | 3/2002 |
| JP | 2002-269936 A | 9/2002 |
| JP | 2002-288911 A | 10/2002 |
| JP | 3095682 U | 5/2003 |
| JP | 3098770 U | 10/2003 |

* cited by examiner

OPTICAL DISK DEVICE

TECHNICAL FIELD

This invention relates to an optical disk device that performs writing or reading of an information signal on a optical disk such as, for example, a compact disk (CD), a digital versatile disk (DVD) or the like.

BACKGROUND ART

There is known an optical disk device having a disk tray capable of protruding and retracting through an opening formed on a front surface of the device. An optical disk is placed on the disk tray protruding through the opening, and then the disk tray retracts into the device, so that the optical disk is stored at a predetermined position in the device. After the optical disk is stored, a turntable moves upward and lifts the optical disk, and the optical disk is sandwiched between the turntable and a clamper. In this state, the optical disk rotates at a predetermined rotational speed by the rotation of the turntable, and the optical pickup moves between an outer peripheral position and an inner peripheral position of the optical disk, so that the information signal is recorded on or reproduced from a data area of the optical disk.

In the optical disk device of this type, there are four operations that require driving forces of a motor or the like: a disk carrying operation that moves the disk tray back and forth to carry the optical disk, a turntable vertically-moving operation that vertically moves the turntable between a descent position and an ascent position, a disk rotating operation that drives the turntable to rotate the optical disk, and a pickup feeding operation that causes the optical pickup to move back and forth.

Generally, among the above described four operations, the disk carrying operation and the turntable vertically-moving operation are sequentially performed by a common motor. However, the disk rotating operation and the pickup feeding operation are respectively performed by exclusive motors. Thus, the above described four operations are generally performed by three motors.

In contrast, there is proposed an optical disk device configured to sequentially perform three operations (i.e., the disk carrying operation, the turntable vertically-moving operation and the pickup feeding operation) by one motor, and perform the disk rotating operation by another motor, with the result that the above described four operations are performed by two motors (see, for example, Patent Publication 1).

Patent Publication 1: Japanese Laid-Open Patent Publication 2002-93013 (Pages 15 through 18 and FIG. 2).

DISCLOSURE OF THE INVENTION

Problems to be Solved by the Invention

The optical disk device disclosed in Patent Publication 1 has a cam gear whose outer circumference includes a part on which no tooth is formed (referred to as a no-tooth part). A cam groove for vertically moving the turntable is formed on the cam gear. On the pickup feeding operation, the no-tooth part of the cam gear faces a gear (a loading gear) that belongs to a gear train driven by a motor, so as to prevent the transmission of rotation to the turntable side and the disk tray side. When the cam gear rotates to vertically move the turntable, the no-tooth part of the cam gear faces a gear for moving the disk tray (i.e., for carrying the disk), so as to prevent transmission of rotation to the disk tray side and the pickup side.

However, in the optical disk device disclosed in Patent Publication 1, there are strict restrictions on the relative positions of respective components. For example, the no-tooth part of the cam gear must face the above described loading gear in a state where the disk tray is in a storing-completion position. Therefore, on the assembling of the optical disk device, it is necessary to move the disk tray to the storing-completion position, and assemble other components in this state. As a result, there are restrictions on the order of assembly of the components, and therefore ease of assembly is insufficient.

Moreover, in the case where, for example, the disk tray having protruded after the ejection of the optical disk is pushed into the interior of the device by an external force, there is a possibility that the relative position of the gear for carrying the disk with respect to the above described cam gear may deviate (for example, deviate from the correct engaging state by several teeth). As a result, there is a problem that, when the turntable vertically-moving operation is started after the disk tray moves to the storing-completion position, the no-tooth part of the cam gear does not face the gear for carrying the disk, and the rotation is not transmitted to the disk tray side. Such a problem is caused by positioning errors of the components during the assembly.

The present invention is intended to solve the above described problems, and an object of the present invention is to provide an optical disk device capable of performing a pickup feeding operation, a turntable vertically-moving operation, and a disk carrying operation by one driving source, and capable of enhancing ease of assembly.

Means for Solving the Problems

An optical disk device according to the invention includes:
a main chassis;
a disk tray movable in a direction protruding from said main chassis and in the opposite direction so as to carry said optical disk in or out of said main chassis;
a turntable that rotates said optical disk carried-in by said disk tray;
a traverse chassis that supports said turntable, said traverse chassis being supported by said main chassis so that said traverse chassis is swingable between a holding position in which said turntable is able to hold said optical disk and a retracting position retracting from said holding position;
an optical pickup that performs recording or reproducing of a signal on said optical disk rotated by said turntable; and
a common motor that generates a driving force for feeding said optical pickup, for swinging said traverse chassis, and for moving said disk tray.

The optical disk device according to the present invention further includes:
a first gear that rotates by a driving force of said motor;
a second gear that rotates by transmission of rotation from said first gear;
a rack portion integrally formed with said optical pickup, said rack portion engaging said first gear to move, an engagement between said rack portion and said first gear being released when said rack portion reaches a predetermined engagement-releasing area;
a slide rack relatively movable with respect to said rack portion, said slide rack engaging said first gear to move;
a slider member having an engaging portion capable of engaging said second gear and a cam portion that causes said traverse chassis to swing between said holding position and said retracting position; and a trigger member that moves in conjunction with said slide rack in a state where said engagement between said rack portion and said first gear is released, so as to move said slider member to a position in which said slider member engages said second gear.

The optical disk device according to the present invention is so configured that said first gear and said second gear have the same number of teeth, and the rotation is transmitted from said first gear to said second gear in such a manner that the ratio of the number of rotations of said first gear to the number of rotations of said second gear is 1:1.

Advantage of the Invention

According to the optical disk of the present invention, the first gear and the second gear have the same number of teeth, and the rotation is so transmitted that the ratio of the number of rotations of the first gear to the number of rotations of the second gear is 1:1. Therefore, the relationship between the phases of the first gear and the second gear when the slider member driven by the first gear via the slide rack engages the second gear is kept constant (i.e., the engaging phase is kept constant), and is not influenced by phases of the first gear, second gear, intermediate gears or the like during assembly. Accordingly, it can be ensured that the rotating second gear engages a leading tooth of the engaging portion (the rack portion) of the slider member. In other words, when the optical pickup device is being assembled, the assembly can be performed without considering the phases of the first, second and intermediate gears, and therefore ease of assembly is enhanced. As a result, it becomes possible to obtain the optical disk device capable of performing the pickup feeding operation, the turntable vertically-moving operation and the disk carrying operation by one driving source, and capable of enhancing ease of assembly.

Figure 1:
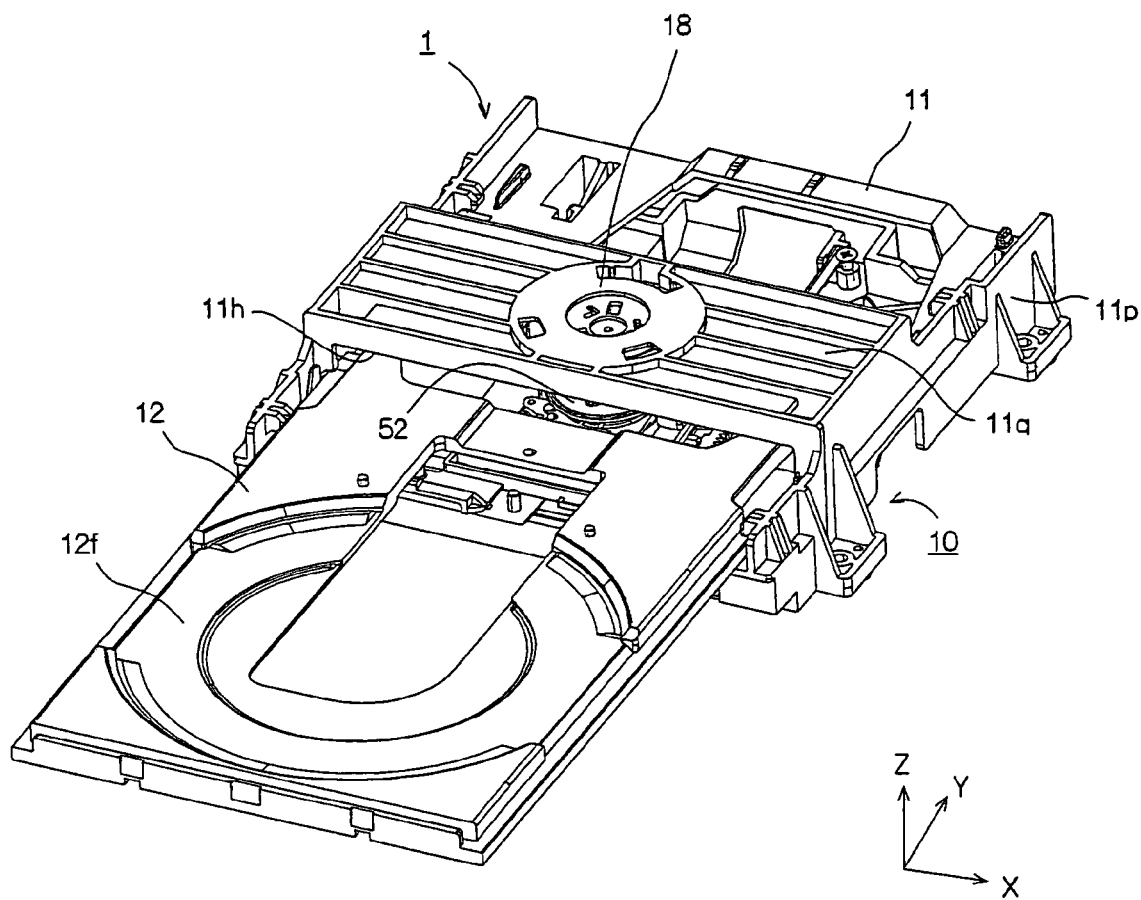
FIG. 1 is a perspective view of a disk device according to the embodiment of the present invention in a state where a disk tray protrudes, as seen obliquely from above.

DESCRIPTION OF REFERENCE NUMERALS 1 optical disk device, 10 loading unit, 11 main chassis, 12 disk tray, 12a rack portion, 12b first guide groove, 12c second guide groove, 12d third guide groove, 13 tray gear, 13a larger gear portion, 13b smaller gear portion, 15 cam slider, 15c boss portion, 15d rack portion, 18 clamper, 50 traverse unit, 51 traverse chassis, 51c boss portion for vertical movement, 52 turntable, 54 spindle motor, 57 optical pickup, 57a rack portion, 58 slide rack, 59 spring, 62 motor, 64 feed gear, 64a smaller gear portion, 64b larger gear portion, 64c intermediate gear portion, 65 first intermediate gear, 66 second intermediate gear, 69 trigger plate, 69a boss portion, 69b cam groove, 70 intermediary board, 72 switch.

BEST MODE FOR CARRYING OUT THE INVENTION

The best mode for carrying out the present invention will be described in concrete.

<Basic Configuration>

First, the basic configuration of the optical disk device 1 according to the embodiment of the present invention will be described.

Figure 2:
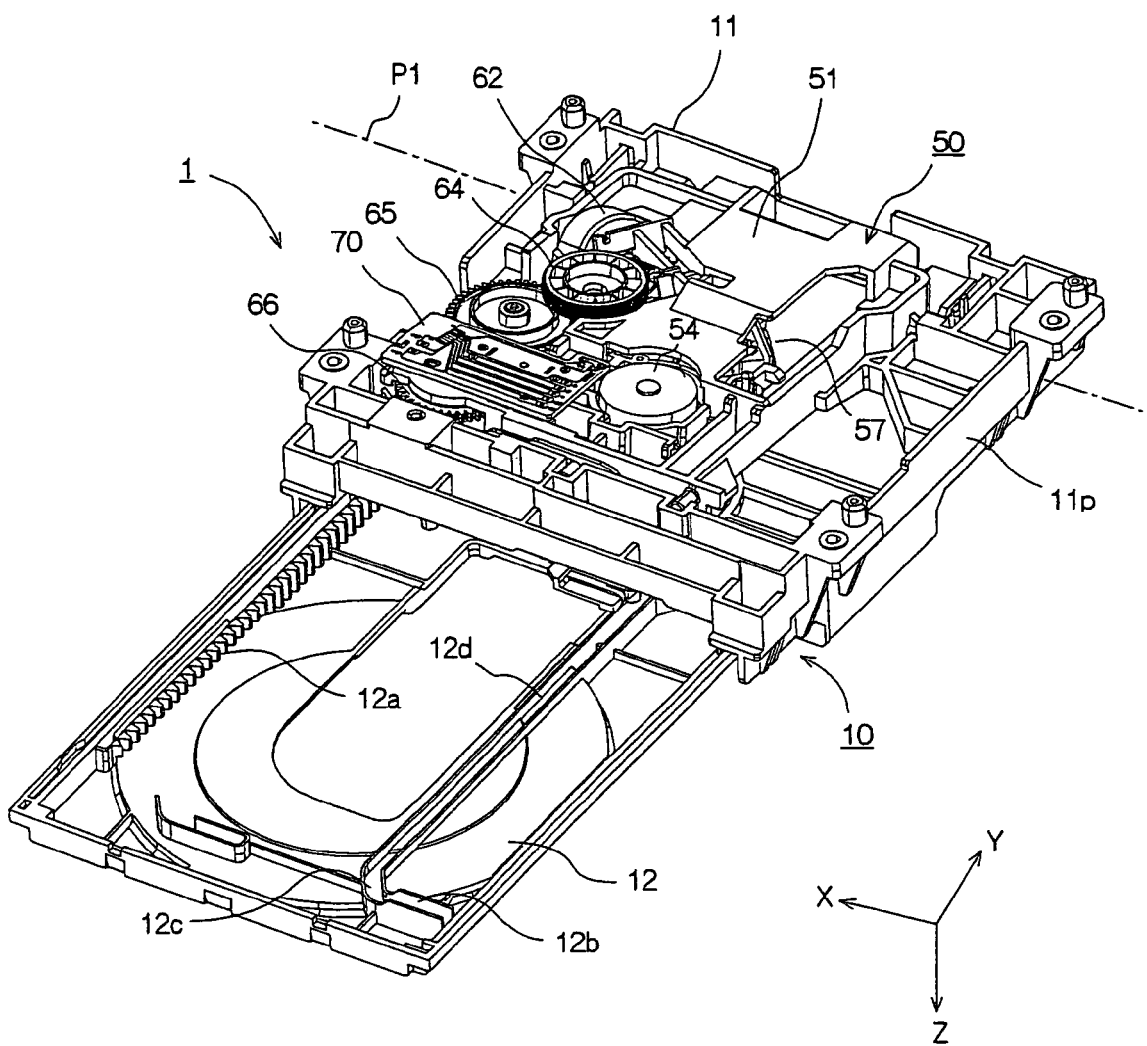
FIG. 2 is a perspective view of the optical disk device according to the embodiment of the present invention in a state where the disk tray protrudes, as seen obliquely from below.
Figure 3:
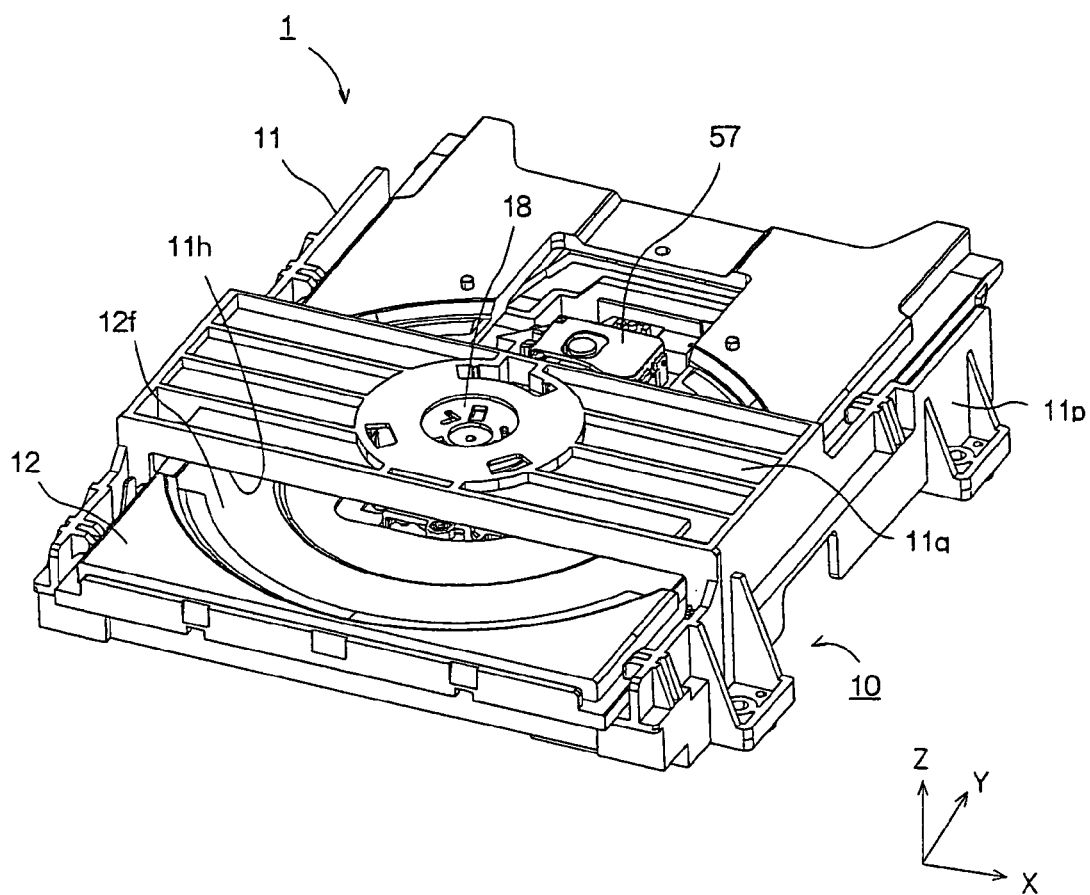
FIG. 3 is a perspective view of the optical disk device according to the embodiment of the present invention in a state where the disk tray retracts, as seen obliquely from above.
Figure 4:
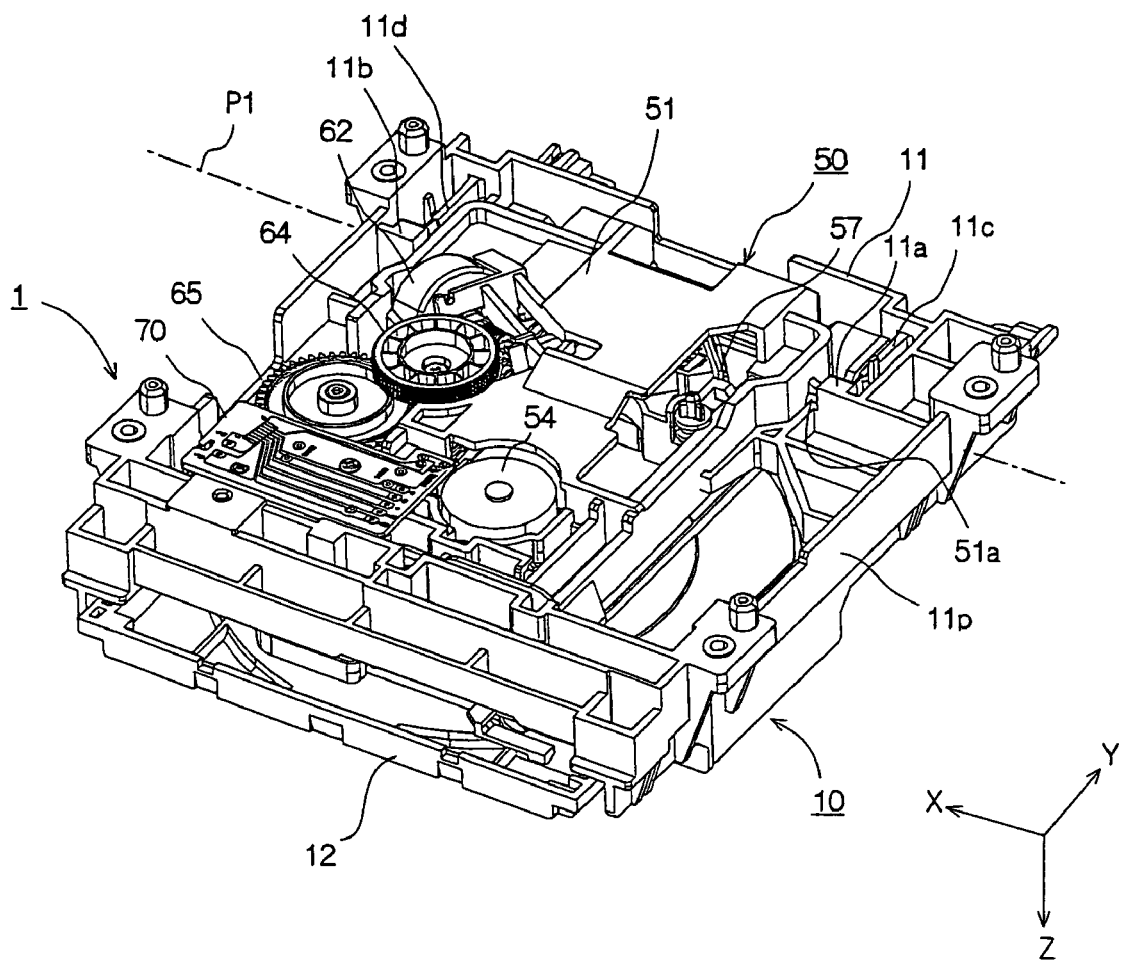
FIG. 4 is a perspective view of the optical disk device according to the embodiment of the present invention in a state where the disk tray retracts, as seen obliquely from below.

FIGS. 1 and 2 are perspective views of the optical disk device 1 according to the embodiment in a state where a disk tray protrudes, as seen obliquely from above and obliquely seen from below, respectively. FIGS. 3 and 4 perspective views of the optical disk device 1 according to the embodiment in a state where the disk tray retracts, as seen obliquely from above and obliquely seen below, respectively.

As shown in FIG. 1, the optical disk device 1 includes a main chassis 11 and a traverse chassis 51 swingably supported by the main chassis 11. The main chassis 11 is a component that constitutes a basic body of the optical disk device 1. A disk tray 12 is mounted in the main chassis 11 so that the disk tray 12 is movable back and forth in directions protruding from and retracting into the main chassis 11. The main chassis 11 includes a frame body 11p in which the disk tray 12 and the traverse chassis 51 can be housed. An opening portion 11h is formed on the frame body 11p, and the disk tray 12 can move through the opening portion 11h.

Hereinafter, the direction in which the disk tray 12 protrudes and retracts is defined as the Y direction. The direction in which the disk tray 12 retracts is defined as the +Y direction. The direction in which the disk tray 12 protrudes is defined as the −Y direction. On a placing surface of the disk tray 12 on which the optical disk is placed, the direction perpendicular to the above described Y direction is defined as the X direction. Facing in the +Y direction, the right side is defined as the +X direction, and the left side is defined as the −X direction. The direction perpendicular to the placing surface of the disk tray 12 on which the optical disk is placed is defined as the Z direction. The placing surface (on which the optical disk is placed) side of the disk tray 12 is defied as the +Z direction, and the opposite side is defined as the −Z direction.

The disk tray 12 is a plate member substantially in the shape of a rectangular, and can be housed in the frame body 11p. A placing surface 12f for placing the optical disk is provided on a surface (an upper surface in FIG. 1) of the disk tray 12. The disk tray 12 protrudes through the opening portion 11h to the exterior of the main chassis 11 as shown in FIG. 1, and retracts through the opening portion 11h into the interior of the main chassis 11 as shown in FIG. 3. In a state where the disk tray 12 protrudes to the exterior of the main chassis 11, the optical disk is placed on the placing surface 12f. Then, the disk tray 12 retracts into the main chassis 11, and the optical disk is carried in the optical disk device 1. When the disk tray 12 protrudes from the main chassis 11 from this state, the optical disk is ejected.

A clamp plate 11q is provided on the upper side (the +Z side) of the main chassis 11 so that the clamp plate 11q straddle the disk tray 12 from above. The clamp plate 11q has a rotatable clamper 18 at the center portion in the X direction for holding the optical disk. The clamper 18 is provided on the upper side (the +Z side) of a passage area of the disk tray 12 and the optical disk, in order to prevent the clamper 18 from interfering with the disk tray 12 and the optical disk that move back and forth along the Y direction. A magnet 17 (FIG. 8) is housed in the clamper 18.

The traverse chassis 51 has a rectangular shape as seen from above, and has such a size that the traverse chassis 51 can be housed in the frame body 11p. The traverse chassis 51 is supported by the main chassis 11 so that the traverse chassis 51 is swingable about a swing axis P1 (FIGS. 2 and 4) of the X direction at the end of the traverse chassis 51 in the +Y direction.

As shown in FIG. 4, a pair of swing shafts 51a and 51b (only the swing shaft 51a is shown in FIG. 4) project outwardly in the X direction from both side surfaces in the X direction of the end of the traverse chassis 51 in the +Y direction (the end on the swing shafts side). Further, shaft supporting portions 11a and 11b that support the swing shafts 51a and 51b are formed on the main chassis 11. Furthermore, resiliently deformable shaft holding portions 11c and 11d that hold the swing shafts 51a and 51b in the shaft supporting portions 11a and 11b are formed on the main chassis 11. The shaft supporting portions 11a and 11b and the shaft holding portions 11c and 11d constitute a shaft receiving portion that rotatably supports the swing shafts 51a and 51b. With such a shaft receiving portion, the traverse chassis 51 is swingably supported by the main chassis 11.

As shown in FIG. 1, a turntable 52 is provided in the vicinity of the end of the traverse chassis 51 in the −Y direction. The turntable 52 is so configured to hold the optical disk between the turntable 52 and the above described clamper 18. The turntable 52 is made of a material such as iron attracted by a magnetic force, or includes an attractable piece made of a material such as iron. The turntable 52 is attracted by the magnet 17 in the clamper 18 provided on the main chassis 11, and the optical disk is sandwiched between the turntable 52 and the clamper 18. In a state where the optical disk is sandwiched between the turntable 52 and the clamper 18, the turntable 52 rotates by the driving force of a spindle motor 54 (FIG. 5, described later) together with the optical disk.

Further, an optical pickup 57 is supported by the traverse chassis 51 so that the optical pickup 57 is movable in the Y direction. The optical pickup 57 performs recording or reproducing of the information signal on the optical disk.

As shown in FIG. 2, the traverse chassis 51 and respective components assembled in the traverse chassis 51 such as the turn table 52 and the optical pickup 57 constitute a traverse unit 50. The main chassis 11 and respective components assembled in the main chassis 11 such as the disk tray 12 constitute a loading unit 10.

In a state where the disk tray 12 protrudes externally from the main chassis 11, the traverse chassis 51 swings about the swing axis P1 in the direction (downwardly, i.e., in the −Z direction) in which the end of the traverse chassis 51 in the −Y direction moves away from the turntable 52. Further, the traverse chassis 51 is inclined with respect to the main chassis 11 (FIG. 15). In a state where the disk tray 12 retracts in the main chassis 11, when the optical disk reaches the position directly above the turntable 52, the traverse chassis 51 swings about the swing axis P1 so that the traverse chassis 51 becomes parallel to the main chassis 11 (FIG. 14) and the turntable 52 reaches an ascent position (a position in which the turntable 52 is able to hold the optical disk).

In accordance with the upward movement of the turntable 52, the clamper 18 is attracted by the turntable 52 because of the attraction force of the magnet 17 in the clamper 18, and the optical disk is sandwiched between the clamper 18 and the turntable 52. In this state, the spindle motor 54 (described later) directly connected to the turntable 52 rotates, and causes the optical disk to rotate together with the turntable 52 at a predetermined rotation speed. Further, the optical pickup 57 moves in the direction of the radius of the optical disk (the Y direction), and the information signal is recorded on or reproduced from the data area of the optical disk.

Hereinafter, the traverse unit 50 and the loading unit 10 are respectively described in detail.

<Traverse Unit 50>

Figure 5:
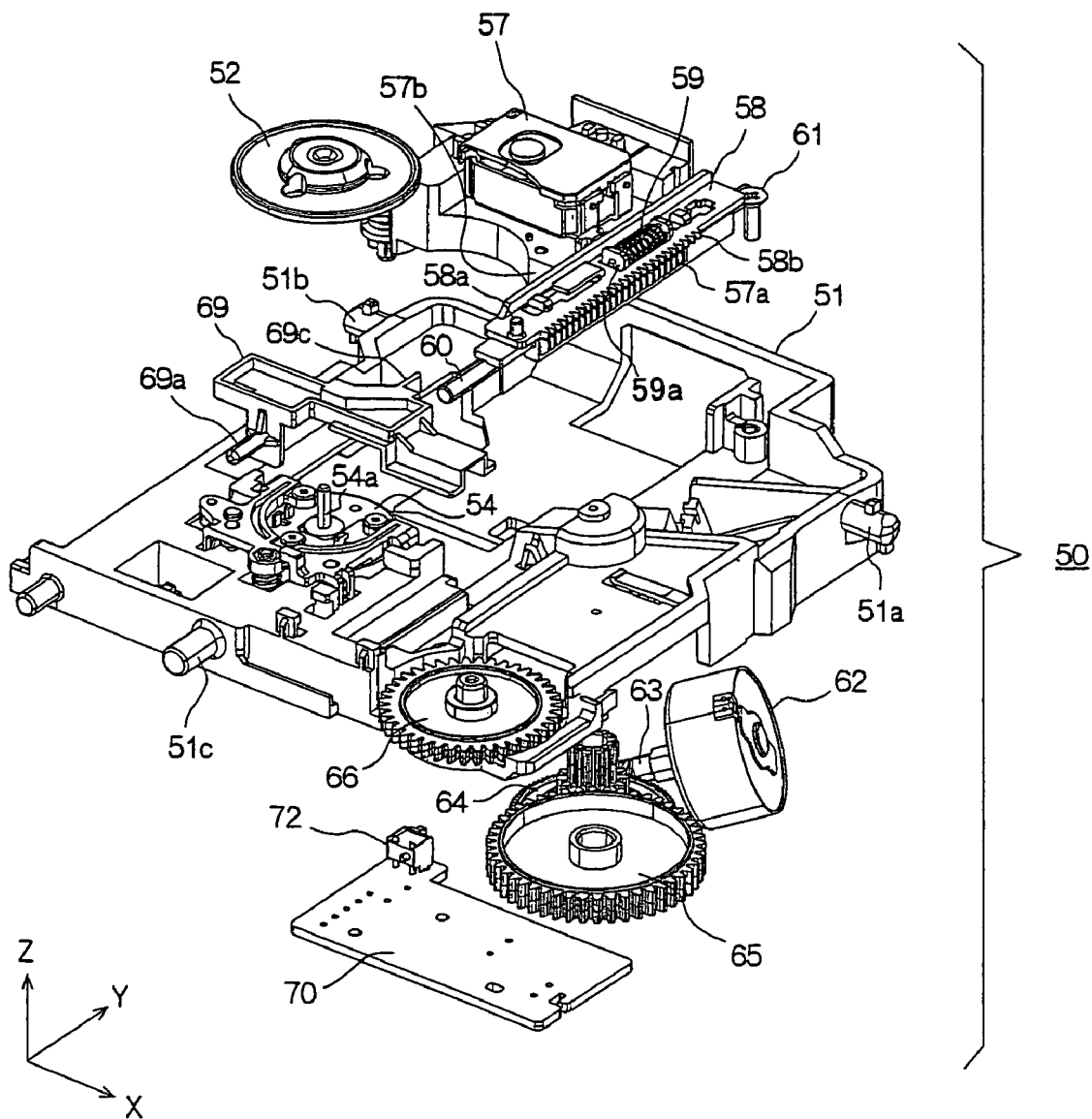
FIG. 5 is an exploded perspective view of a traverse unit of the optical disk device according to the embodiment of the present invention.

FIG. 5 is an exploded perspective view of the traverse unit 50. The above described swing shafts 51a and 51b project from both side surfaces of the traverse chassis 51 in the X direction at the end of the traverse chassis 51 in the +Y direction. A boss portion (for vertical movement) 51c projects from the end surface of the traverse chassis 51 in the −Y direction. The boss portion (for vertical movement) 51c engages a first cam groove 15a (FIG. 10) of a cam slider 15 descried later so as to swing the traverse chassis 51.

The spindle motor 54 is provided in the vicinity of the end of the traverse chassis 51 in the −Y direction in such a manner that a rotation shaft 54a of the spindle motor 54 is directed vertically upward (the +Z direction). A center hole of the turntable 52 is press-fitted on the tip of the rotation shaft 54a of the spindle motor 54. As the rotation shaft 54a of the spindle motor 54 rotates, the turntable 52 rotates together with the rotation shaft 54a.

A motor 62 is disposed on the +X side of the optical pickup 57 in the traverse chassis 51. The motor 62 is a common driving source of the disk carrying operation, the turntable vertically-moving operation and the pickup feeding operation. A worm gear 63 is fixed to an output shaft of the motor 62, and the worm gear 63 rotates by the rotation of the motor 62. The motor 62 is mounted on the traverse chassis 51 by means of screws so that the motor 62 is inclined at an angle corresponding to a lead angle of the worm gear 63.

Figure 6:
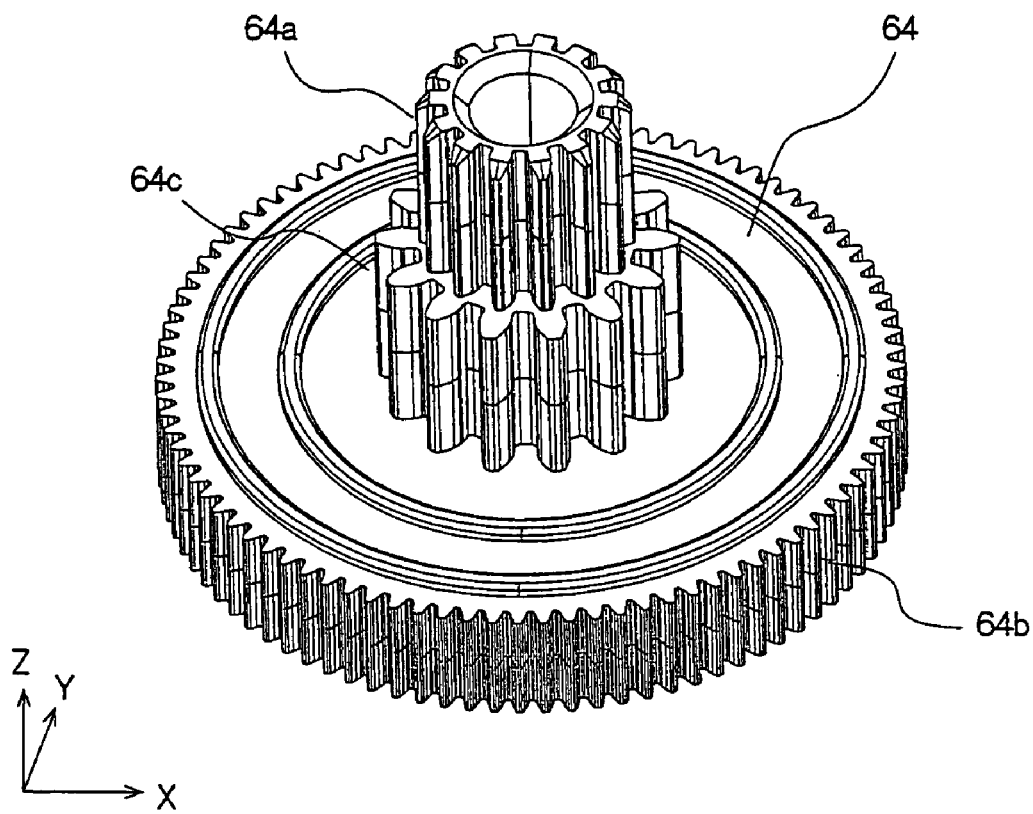
FIG. 6 is a perspective view of a feed gear of the optical disk device according to the embodiment of the present invention.

A feed gear (a first gear) 64 is rotatably supported by the traverse chassis 51 for moving the optical pickup 57 in the Y direction. As shown in FIG. 6, the feed gear 64 includes a larger gear portion 64b, an intermediate gear portion (a transmission gear portion) 64c, and a smaller gear portion (a driving gear portion) 64a respectively corresponding to lower, intermediate and upper steps, and coaxially aligned with each other. The larger gear portion 64b, the intermediate gear portion 64c, and the smaller gear portion 64a are composed of spur gears. The pitch circle of the larger gear portion 64b is greater than the pitch circle of the intermediate gear portion 64c. The pitch circle of the intermediate gear portion 64c is greater than the pitch circle of the smaller gear portion 64a. The number of teeth of the intermediate gear portion 64c is the same as the number of teeth of the smaller gear portion 64a. The module of the intermediate gear portion 64c is greater than the module of the smaller gear portion 64a. As shown in FIG. 5, the larger gear portion 64b engages the worm gear 63 fixed to the rotation shaft of the motor 62. As the axial direction of the worm gear 63 is inclined with respect to the direction of the rotation axis (the Z direction) of the feed gear 64 at an angle corresponding to the lead angle of the worm gear 63 (FIG. 5), it is possible to engage the worm gear 63 and the larger gear portion 64b even if the larger gear portion 64 is a spur gear.

A first intermediate gear 65 and a second intermediate gear 66 are rotatably supported by the traverse chassis 51. The first intermediate gear 65 and the second intermediate gear 66 are composed of spur gears, and are so supported as to be rotatable about the rotation axes of the Z direction. The first intermediate gear 65 constantly engages the intermediate gear portion 64c of the feed gear 64. The second intermediate gear 66 constantly engages the first intermediate gear 65 and a tray gear 13 described later, and thereby transmits the rotation of the feed gear 64 to the tray gear 13.

The optical pickup 57 is disposed on the +Z side in the traverse chassis 51. The optical pickup 57 is supported by a main shaft guide 60 (in the form of a shaft) extended in the Y direction from the turntable 52 toward the side end portion of the traverse chassis 51 in the +Y direction so that the optical pickup 57 is movable in the Y direction. The end of the main shaft guide 60 in the +Y direction is fixed to the traverse chassis 51 by means of a flat head screw 61. The end of the main shaft guide 60 in the −Y direction fits in a receiving hole (not shown) formed on the traverse chassis 51. The optical pickup 57 has a through hole formed in the vicinity of the end in the +X direction through which the main shaft guide 60 is inserted, and the optical pickup 57 is guided in the Y direction along the main shaft guide 60. A slide portion 57c (FIG. 11) is formed on the end of the optical pickup 57 in the −X direction, and the slide portion 57c is slidable on the traverse chassis 51.

A rack portion 57a is formed on the end of the optical pickup 57 in the +X direction, and extend in the Y direction. The rack portion 57a is formed on the opposite side to the main part of the optical pickup 57 with respect to the main shaft guide 60. A slide rack 58 is provided on the rack portion 57a so that the slide rack 58 is relatively movable with respect to the rack portion 57a in the Y direction. The slide rack 58 has teeth arranged in the same manner as the rack portion 57a, and the shape (except face width) of the teeth of the slide rack 58 is the same as the rack portion 57a. Both of the rack portion 57a of the optical pickup 57 and the slide rack 58 engage the smaller gear portion 64a (FIG. 6) of the feed gear 64.

In the longitudinal direction (the Y direction) of the slide rack 58, an area of the slide rack 58 on which teeth are formed (referred to as a rack teeth forming area) is longer than a rack teeth forming area of the rack portion 57a. On the rack portion 57a, a spring 59 that forces the slide rack 58 in the +Y direction and a plate 59a that functions as a stopper when the slide rack 58 moves in the +Y direction with respect to the rack portion 57a are provided. In a state shown in FIG. 5, the end (in the −Y direction) of the rack teeth forming area of the slide rack 58 is aligned with the end (in the −Y direction) of the rack teeth forming area of the rack portion 57a. Further, the end (in the +Y direction) of the rack teeth forming area of the slide rack 58 projects in the +Y direction with respect to the end (in the +Y direction) of the rack teeth forming area of the rack portion 57a by a predetermined amount.

A switch-pushing portion 57b is provided on the end surface of the optical pickup 57 in the −Y direction (i.e., an end surface on the inner periphery side of the optical disk). The switch-pushing portion 57b pushes a switch 72 described later when the optical pickup 57 reaches the end of the movable range of the optical pickup 57 in the −Y direction. In this state, the optical pickup 57 (the rack portion 57a or other portion) contacts a not shown fixed member in the traverse chassis 51, and the position of the optical pickup 57 is so regulated that the optical pickup 57 does not further move in the −Y direction.

On the recording or reproducing of the information signal on the optical disk, the smaller gear portion 64a of the feed gear 64 engages both of the rack portion 57a and the slide rack 58. By the rotation of the feed gear 64, the rack portion 57a and the slide rack 58 move in the Y direction. In an area (referred to as an engagement-releasing area) where the tack portion 57a and the slide rack 58 further move in the −Y direction beyond the end of the movable range (in the −Y direction) for recording and reproducing the information signal, the engagement between the rack portion 57a and the smaller gear portion 64a of the feed gear 64 is released, and only the slide rack 58 and the smaller gear portion 64a are kept engaging. When the feed gear 64 further rotates, only the slide rack 58 moves in the −Y direction, resisting the force of the spring 59. When the feed gear 64 rotates in the reverse direction so as to move the slide rack 58 in the +Y direction, the rack portion 57a follows the slide rack 58 by the force of the spring 59, with the result that the smaller gear portion 64a of the feed gear 64 again engages the rack portion 57a. A mechanism including the feed gear 64 and the rack portion 57a constitute a pickup driving mechanism that moves the optical pickup 57 back and forth between the inner peripheral position and the outer peripheral position of the optical disk.

The spring 59 also has a function to restrict the backlash when the slide rack 58 engages the smaller gear portion 64a of the feed gear 64. Further, a boss portion 58a projects from the end of the slide rack 58 in the −Y direction, and the boss portion 58a is able to engage a cam groove 69b of a trigger plate 69 described later.

Figure 7:
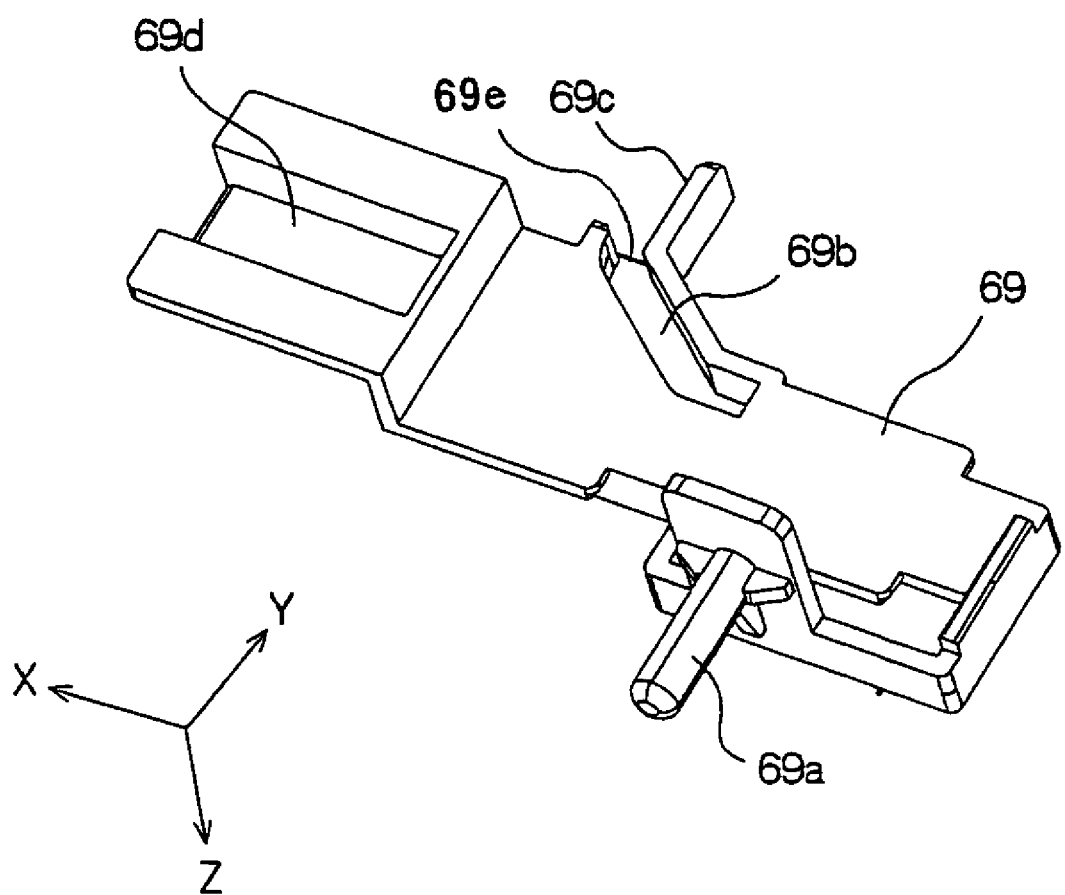
FIG. 7 is a perspective view of a trigger plate of the optical disk device according to the embodiment of the present invention.

The trigger plate (a trigger member) 69 is supported in the vicinity of the end of the traverse chassis 51 in the −Y direction, and the trigger plate 69 is movable in the X direction. FIG. 7 is a perspective view of the trigger plate 69 as seen from below. The trigger plate 69 is a longitudinal member elongated in the X direction as a whole. A boss portion 69a projects from the end of the trigger plate 69 in the −Y direction, and the boss portion 69a is able to engage a cam groove 15a (FIG. 10) of a cam slider 15 described later. The boss portion 69a is also inserted in a guide groove 11f (FIG. 9) of the main chassis 11, and guides the trigger plate 69 in the Z direction.

A cam groove 69b is formed on the bottom surface (the surface of the −Z side) of the trigger plate 69. A boss portion 58a of the slide rack 58 (FIG. 5) engages the cam groove 69b. The cam groove 69b has an opening 69e at the end surface of the trigger plate 69 in the +Y direction. The cam groove 69b extends in the Y direction in the vicinity of the opening 69a, and further extends in the −X direction via an inclined section inclined at approximately 45 degrees. When the slide rack 58 (FIG. 5) moves in the −Y direction, the boss portion 58a engages the cam groove 69b through the opening 69e, and the trigger plate 69 moves in the +X direction because of the contact between the boss portion 58a and the inclined section of the cam groove 69b.

A malfunction-prevention wall 69c projects in the +Y direction from the vicinity of the opening 69e of the trigger plate 69. The malfunction-prevention wall 69c contacts the boss portion 58a (FIG. 5) when the optical pickup 57 is in a movable range for recording and reproducing the information, and prevents the trigger plate 69 from moving in the +X direction. A concave 69d indicated by numeral 69d in FIG. 7 is provided for preventing the trigger plate 69 from interfering with other member (the second intermediate gear 66 or the like) when the trigger plate 69 moves in the +X direction.

As shown in FIG. 5, an intermediary board 70 is mounted on the −Y side of the traverse chassis 51. Signal lines to the spindle motor 54 and the motor 62 are connected to the intermediary board 70. The switch 72 that contacts the switch-pushing portion 57b of the optical pickup 57 is mounted on the intermediary board 70. The switch 72 enables the detection of the optical pickup 57 reaching the end of the movable range in the −Y direction.

<Loading Unit 10>

Figure 8:
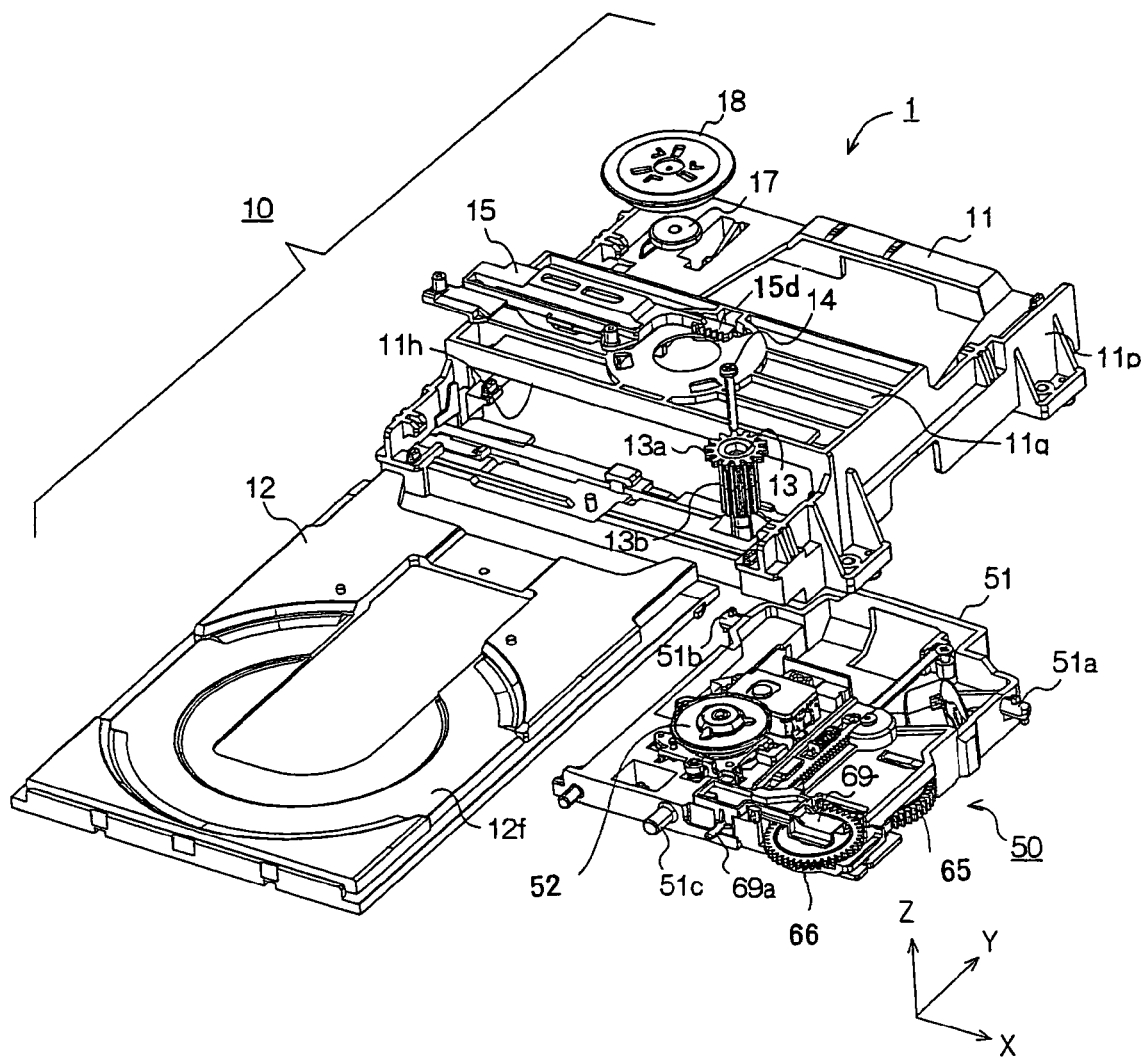
FIG. 8 is an exploded perspective view of the optical disk device according to the embodiment of the present invention.
Figure 9:
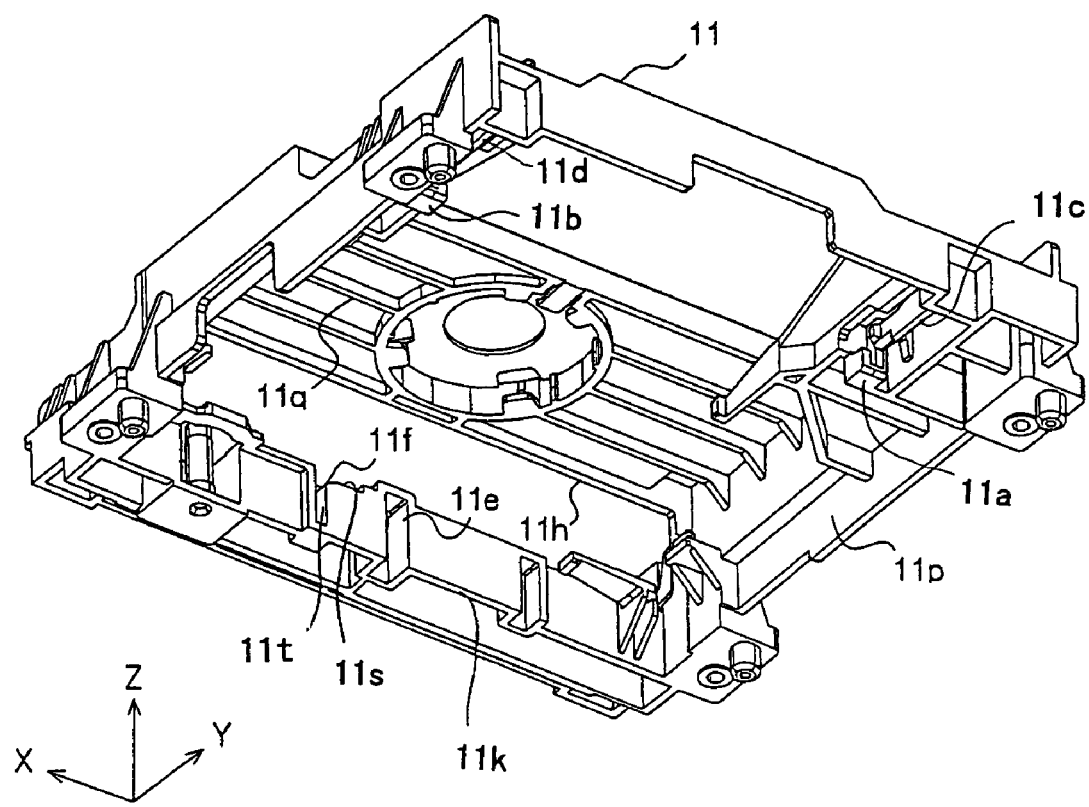
FIG. 9 is a perspective view of a main chassis of the optical disk device according to the embodiment of the present invention.

Next, the configuration of the loading unit 10 will be described in detail. FIG. 8 is an exploded perspective view of the optical disk device 1. FIG. 9 is a perspective view of the main chassis 11 that constitutes a base body of the loading unit 10, as seen obliquely from lower rear side.

As shown in FIG. 9, a wall portion 11k is formed on the frame body 11p of the main chassis 11, and the wall portion 11k faces the end of the traverse unit 50 (FIG. 5) in the −Y direction. The wall portion 11k has a guide groove 11e that engages the boss portion (for vertical movement) 51c of the traverse chassis 51 and a guide groove 11f that engages the boss portion 69a of the trigger plate 69. The guide groove 11e linearly extends in the Z direction. The guide groove 11f includes a vertical groove portion 11t that extends in the Z direction and a horizontal groove portion 11s that extends in the −X direction from the upper end of the vertical groove portion 11t via an inclined portion. As the boss portion (for vertical movement) 51c moves along the guide groove 11e, the end of the traverse chassis 51 in the −Y direction is guided in the Z direction. As the boss portion 69a of the trigger plate 69 moves sequentially along the horizontal groove portion 11s and the vertical groove portion 11t of the guide groove 11f, the trigger plate 69 is guided in the X direction and then in the Z direction.

As shown in FIG. 2, a rack portion 12a and a guide groove 12d are respectively formed on both sides of the disk tray 12 in the X direction, and both extend in the Y direction. Further, a guide groove 12c extends from the end of the guide groove 12d in the −Y direction so that the guide groove 12c is inclined to the −X direction at a predetermined angle. A groove 12b further extends in the X direction from the guide groove 12c.

As shown in FIG. 8, a support shaft portion 14 is planted on a corner at the end of the main chassis 11 in −Y direction and at the end of the main chassis 11 in the −X direction. The tray gear 13 is rotatably supported by the support shaft portion 14. The tray gear 13 includes a smaller gear portion 13b that constantly engages the second intermediate gear 66 on the traverse unit 50 and a larger gear portion 13a capable of engaging the rack portion 12a of the disk tray 12. The larger gear portion 13a and the smaller gear portion 13b have the same number of teeth, and the module of the larger gear portion 13a is greater than the module of the smaller gear portion 13b. The number of teeth of the smaller gear portion 13b (i.e., the number of teeth of the larger gear portion 13a) is the same as the smaller gear portion 64a and the intermediate gear portion 64c of the feed gear 64 (FIG. 6). The rotation is transmitted to the tray gear 13 so that the ratio of the number of rotations of the smaller gear portion 13b of the tray gear 13 to the number of rotations of the smaller gear portion 64a (and the intermediate gear portion 64c) of the feed gear 64 is 1:1.

When the tray gear 13 rotates in a state where the rack portion 12a of the disk tray 12 engages the larger gear portion 13a of the tray gear 13, the disk tray 12 protrudes from the main chassis 11 or retracts into the main chassis 11, i.e., the disk is carried.

Figure 10:
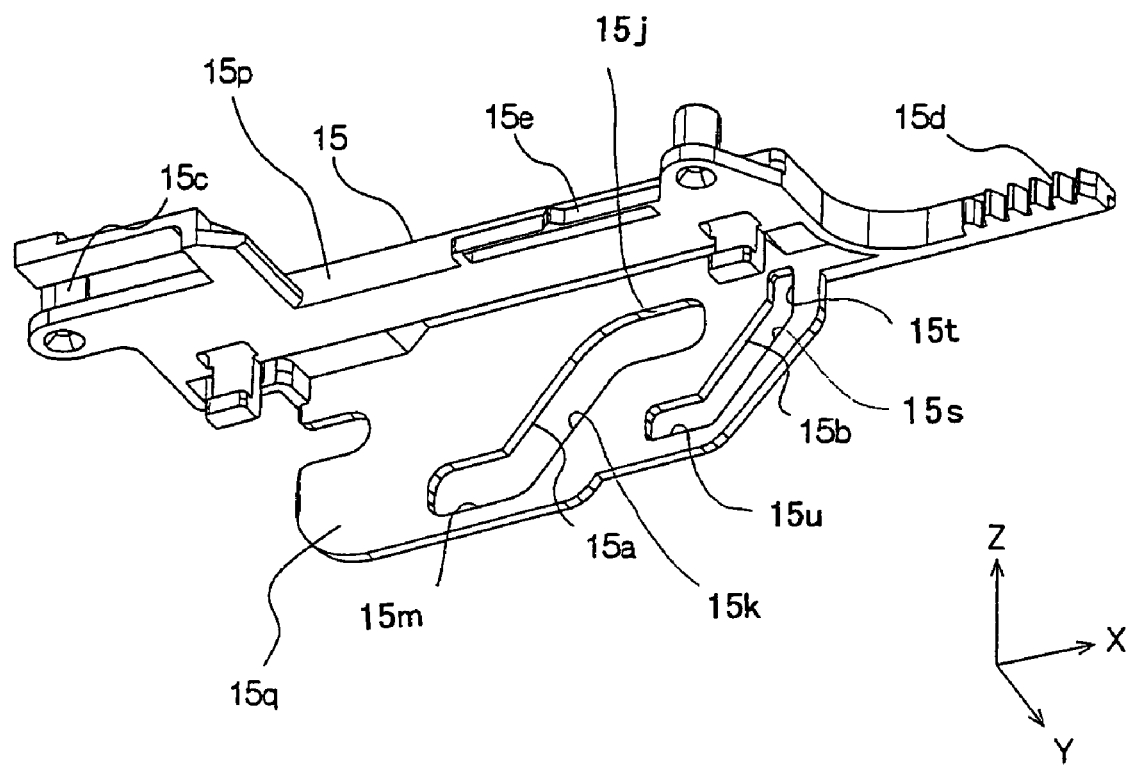
FIG. 10 is a perspective view of a cam slider of the optical disk device according to the embodiment of the present invention.

A cam slider (a slider member) 15 is provided in the vicinity of the end of the main chassis 11 in the −Y direction so that the cam slider 15 is movable back and forth in the X direction. FIG. 10 is a perspective view of the cam slider 15. The cam slider 15 includes a first piece 15p in the shape of a longitudinal plate elongated in the X direction, and a second piece 15q substantially in the shape of a plate perpendicularly connected to a longitudinal side of the first piece 15p.

A boss portion 15c projects from the end portion of the first piece 15p in the −X direction, and the boss portion 15c sequentially engages the guide grooves 12b, 12c and 12d (FIG. 2) of the disk tray 12. The cam slider 15 is supported by the main chassis 11 in a state where the boss portion 15c engages any of the guide grooves 12b, 12c and 12d of the disk tray 12 so that the cam slider 15 is movable back and forth in the X direction.

A rack portion 15d is formed on the end portion of the first piece 15p in the +X direction so that the rack portion 15d is able to engage the smaller gear portion 13b of the tray gear 13. The rack portion 15d engages the smaller gear portion 13b when the cam slider 15 is in the center portion of the movable range. The rack portion 15d does not engage the smaller gear portion 13b but freely rotates when the cam slider 15 is in vicinity of the starting point of the movable range and in the vicinity of the ending point of the movable range.

A first cam groove 15a that engages the boss portion (for vertical movement) 51c of the traverse chassis 51 and a second cam groove 15b that engages the boss portion 69a of the trigger plate 69 are formed on the second piece 15q. The first cam groove 15a includes a groove portion (referred to as an inclined groove portion 15k) so inclined that the groove portion shifts in the +Z direction as the position proceeds to the +X direction. Further, a groove portion (referred to as an upper horizontal groove portion 15j) extends in the +X direction from the upper end of the inclined groove portion 15k. A groove portion (referred to as a lower horizontal groove portion 15m) extends in the −X direction from the lower end of the inclined groove portion 15k.

As is the case with the first cam groove 15a, the second cam groove 15b includes a groove portion (referred to as an inclined groove portion 15s) so inclined that the groove portion shifts in the +Z direction as the position proceeds to the +X direction. A groove portion (referred to as a vertical groove portion 15t) extends in the +Z direction from the upper end of the inclined groove portion 15s. A groove portion (referred to as a horizontal groove portion 15u) extends in the −X direction from the lower end of the inclined groove portion 15s.

The operation of the optical disk device 1 configured as above will be described.

<Feeding Operation of Optical Pickup>

Figure 11:
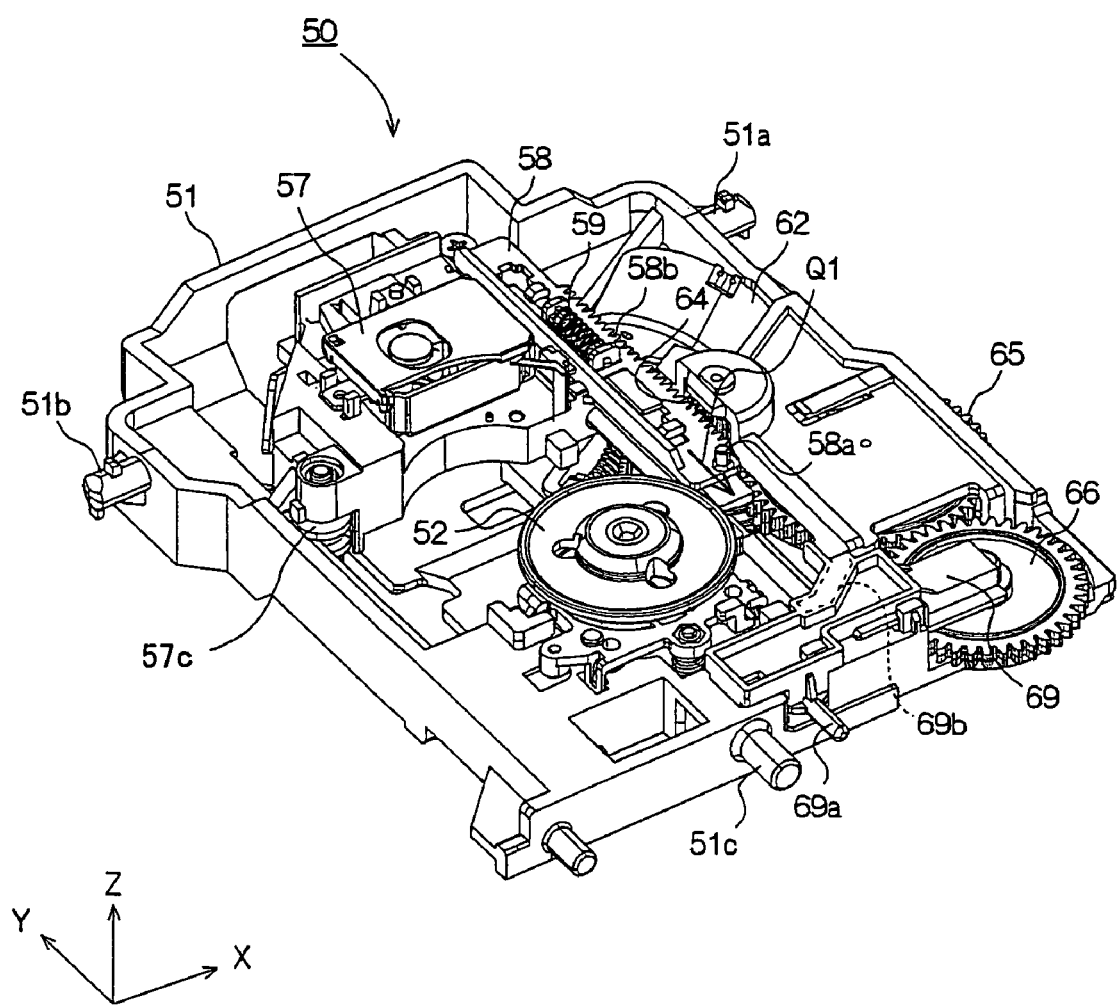
FIG. 11 is a perspective view of the traverse unit of the optical disk device according to the embodiment of the present invention in a state where an optical pickup is in an outer peripheral position of the optical disk.
Figure 12:
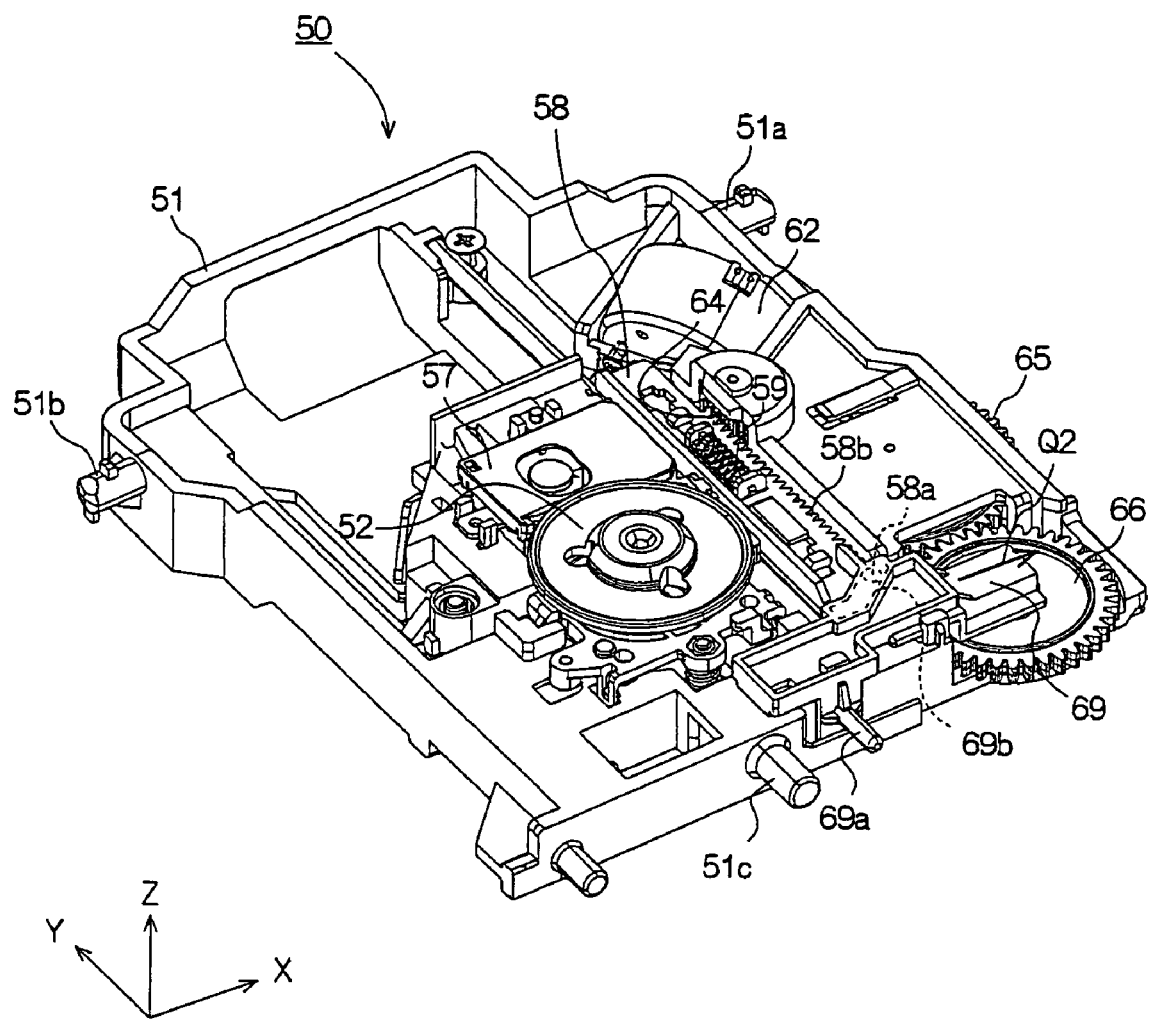
FIG. 12 is a perspective view of the traverse unit of the optical disk device according to the embodiment of the present invention in a state where the optical pickup is in an innermost peripheral position.
Figure 13:
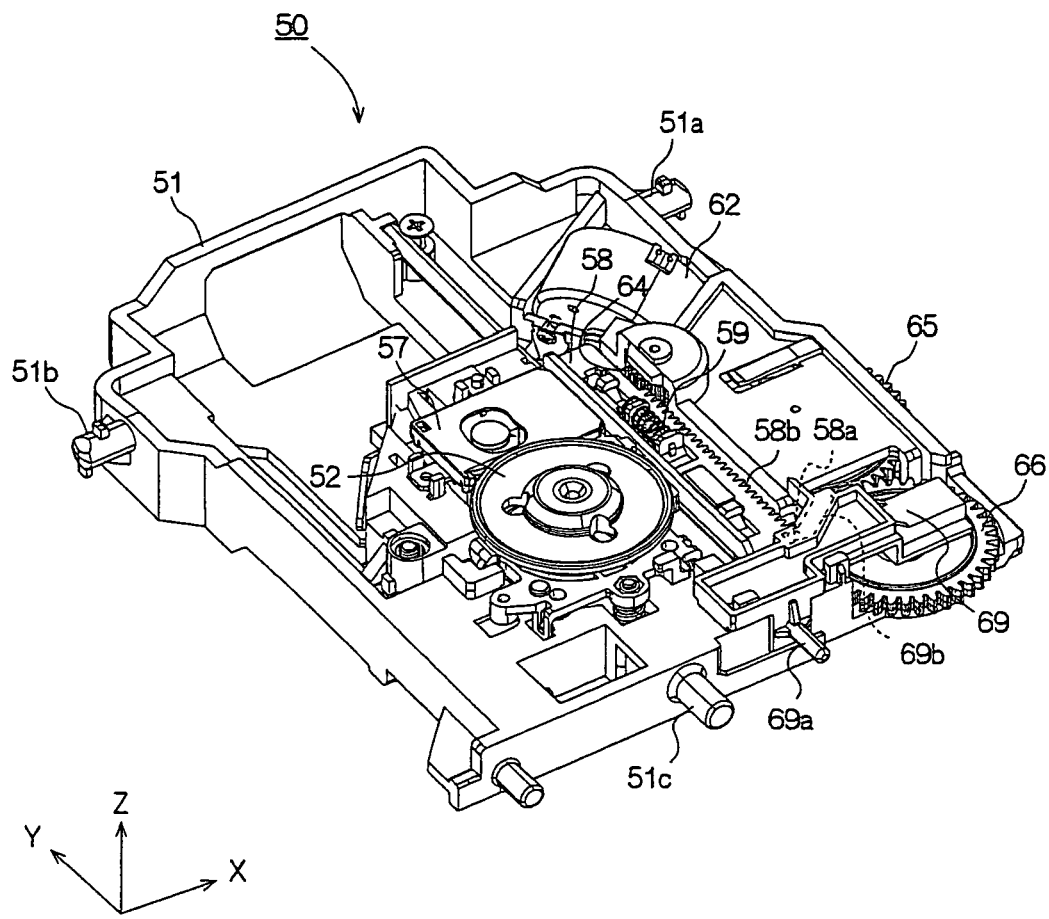
FIG. 13 is a perspective view of the traverse unit of the optical disk device according to the embodiment of the present invention in a state where the optical pickup further moves to the inner periphery side from the state shown in FIG. 12.

FIG. 11 is a perspective view of the traverse unit 50 in a state where the optical pickup 57 faces the outer peripheral position of the optical disk. FIG. 12 is a perspective view of the traverse unit 50 in a state where the optical pickup 57 further moves in the −Y direction beyond the inner peripheral position of the data area. FIG. 13 is a perspective view of the traverse unit 50 in a state where the slide rack 58 further moves in the −Y direction from the state shown in FIG. 12.

As shown in FIG. 11, when the worm gear 63 rotates by the rotational driving force of the motor 62, the feed gear 64 that engages the worm gear 63 rotates. By the engagement between the smaller gear portion 64a (FIG. 6) of the feed gear 64 and the rack portion 57a of the optical pickup 57 (FIG. 5), the rotation of the motor 62 is transmitted to the optical pickup 57, and the optical pickup moves along the main shaft guide 60 in the Y direction. In accordance with the direction of the rotation of the motor 62, the optical pickup 57 moves in the +Y direction and the −Y direction, and "the pickup feeding operation" is performed. For example, in the case of reproducing operation, the optical pickup 57 moves to a position on the optical disk on which the intended information signal is recorded, and reproduces the information signal.

Because of the engagement between the smaller gear portion 64a of the feed gear 64 and the slide rack 58, the slide rack 58 moves back and forth in the Y direction together with the optical pickup 57.

When the optical pickup 57 reaches the inner peripheral position of the data area from the outer peripheral position (FIG. 11) of the data area of the optical disk, and when the optical pickup 57 further moves in the −Y direction beyond the data area, the boss portion 58a of the slide rack 58 moves into the cam groove 69b of the trigger plate 69 as shown by an arrow Q1 in FIG. 11.

When the optical pickup 57 reaches the end of the movable range in the −Y direction, the switch-pushing portion 57b of the optical pickup 57 pushes the switch 72 (FIG. 5), and therefore it is detected that the optical pickup 57 reaches the end of the movable range in the −Y direction. In this position, the engagement between the rack portion 57a of the optical pickup 57 and the smaller gear portion 64a of the feed gear 64 is released, and the slide rack 58 and the smaller gear portion 64a are kept engaging.

<Transition From Pickup Feeding Operation To Turntable Vertically-Moving Operation>

As shown in FIGS. 12 and 13, when the motor 62 further rotates after the optical pickup 57 reaches the end of the movable range in the −Y direction, the optical pickup 57 does not move, since the engagement between the rack portion 57a and the smaller gear portion 64a of the feed gear 64 has been released. Therefore, only the slide rack 58 moves in the −Y direction because of the engagement between the slide rack 58 and the smaller gear portion 64a of the feed gear 64, resisting the force of the spring 59.

When the slide rack 58 moves in the −Y direction, the trigger plate 69 moves in the +X direction because of the engagement between the cam groove 69b and the boss portion 58a, as shown by an arrow Q2 in FIG. 12. The cam slider 15 moves in conjunction with the trigger plate 69, and the vertically-moving operation of the turntable 52 (described below) is started.

<Turntable Vertically-Moving Operation>

Figure 14:
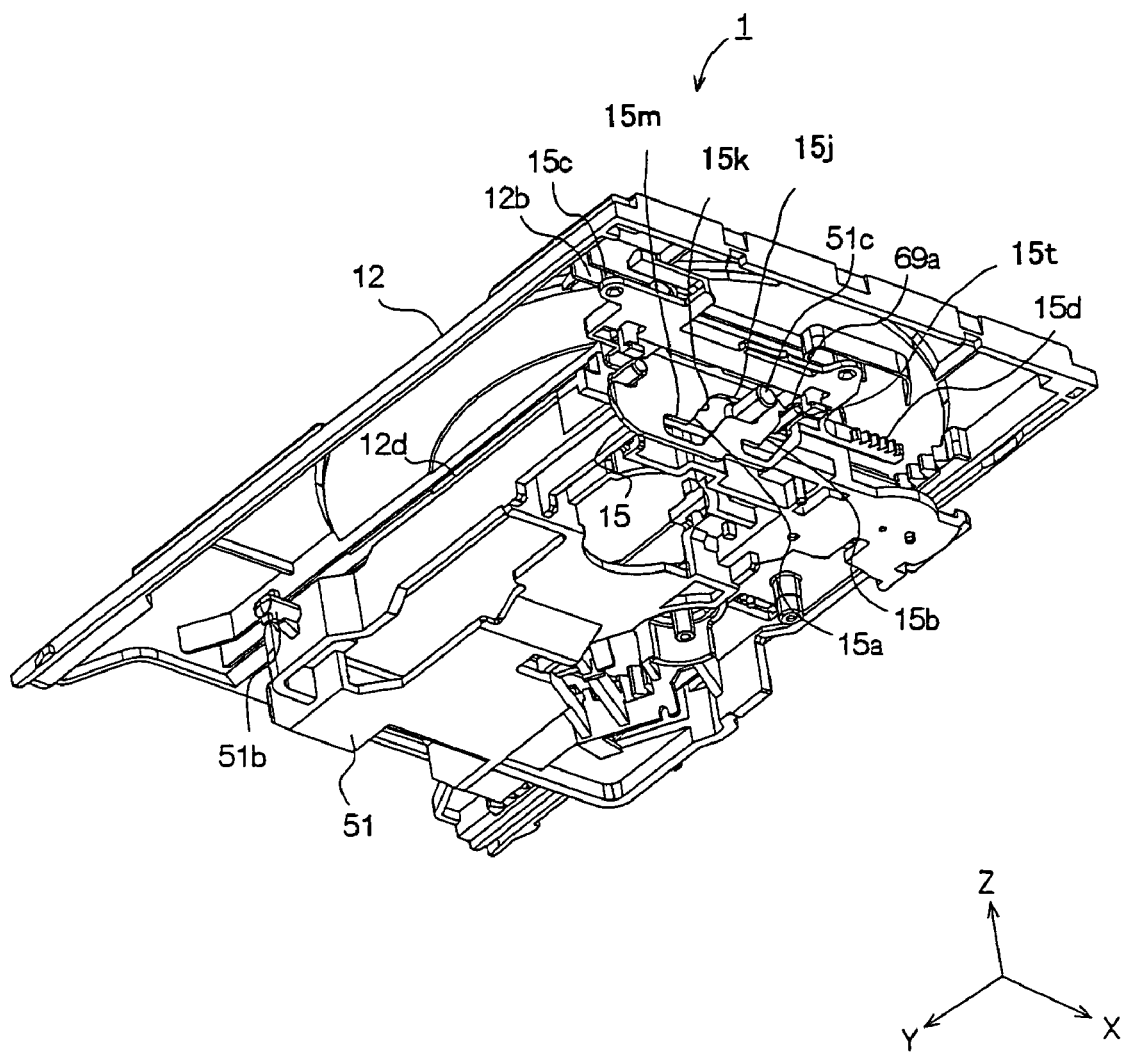
FIG. 14 is a perspective view of the optical disk device according to the embodiment of the present invention in a state where a turntable has moved upward.
Figure 15:
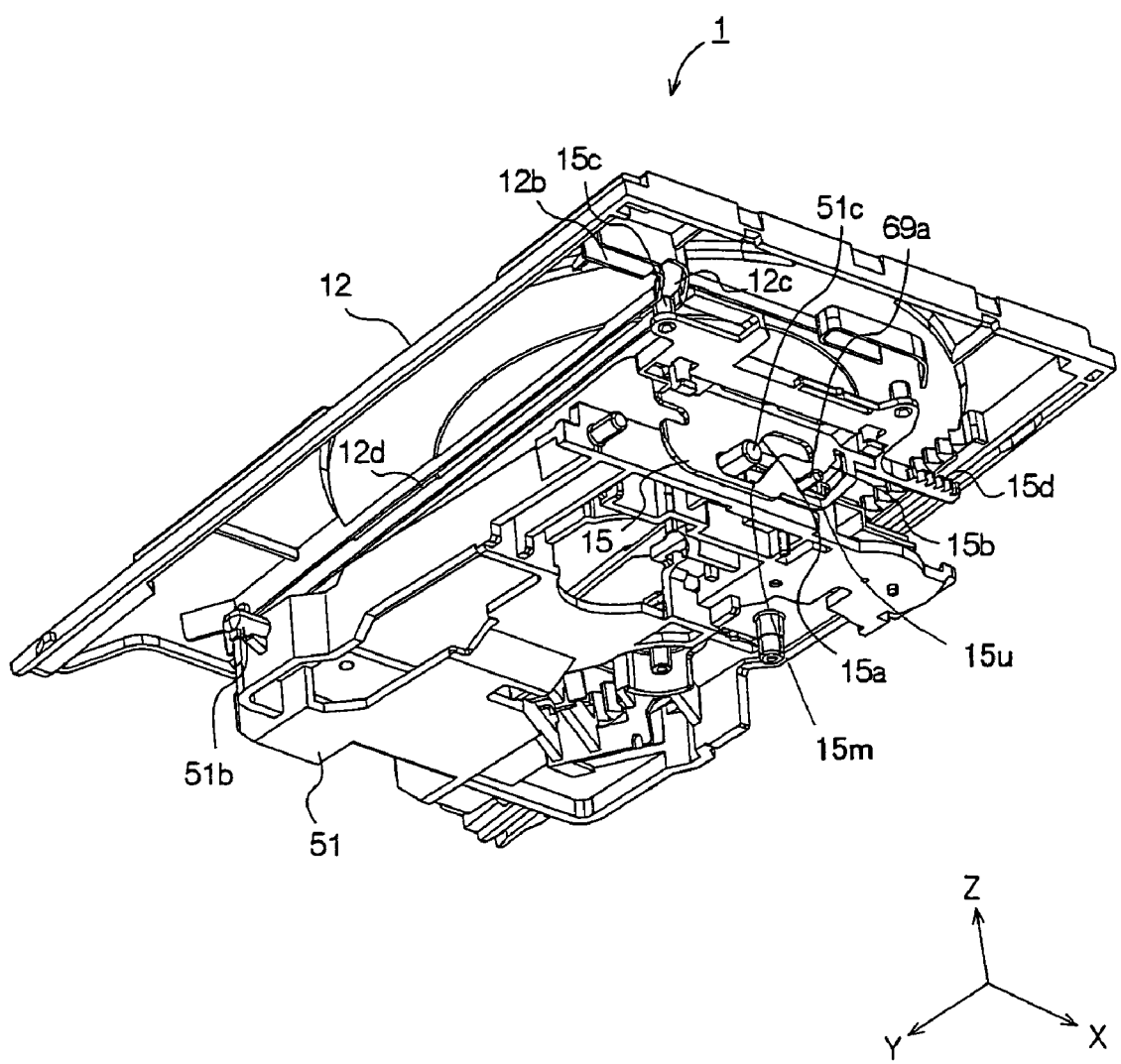
FIG. 15 is a perspective view of the optical disk device according to the embodiment of the present invention in a state where the turntable has moved downward.

FIG. 14 is a perspective view showing a state where the traverse chassis 51 is held parallel to the main chassis 11, as seen from below (the −Z side). FIG. 15 is a perspective view showing a state where the traverse chassis 51 is inclined with respect to the main chassis 11, as seen from below (the −Z side). In FIGS. 14 and 15, the frame body 11p of the main chassis 11 is omitted.

As shown in FIG. 14, immediately before the trigger plate 69 starts moving in the +X direction, the boss portion 69a of the trigger plate 69 positions in the vertical groove portion 15t of the second cam groove 15b of the cam slider 15, and the boss portion (for vertical movement) 51c of the traverse chassis 51 positions in the upper horizontal groove portion 15j of the first groove 15a. With this, the traverse unit 50 is supported in the upper position in such an attitude that the traverse unit 50 is almost parallel to the disk tray 12.

In this state, the trigger plate 69 positions at the end of the movable range in the −X direction, and the rack portion 15d of the cam slider 15 and the smaller gear portion 13b (FIG. 8) of the tray gear 13 do not engage each other.

When the trigger plate 69 moves in the +X direction, the boss portion 69a of the trigger plate 69 pushes the vertical groove portion 15t of the second cam groove 15b of the cam slider 15 in the +X direction, and the cam slider 15 moves in the +X direction. At this time, the boss portion 69a of the trigger plate 69 moves horizontally in the horizontal groove portion 11s (FIG. 9) of the guide groove 11f of the main chassis 11. When the cam slider 15 further moves in the +X direction, the rack portion 15d of the cam slider 15 engages the smaller gear portion 13b (FIG. 8) of the tray gear 13. In this stage, the traverse chassis 51 does not swing, and therefore the rack portion 15d of the cam slider 15 and the smaller gear portion 13b of the tray gear 13 can engage each other at a relatively light load.

After the rack portion 15d of the cam slider 15 and the smaller gear portion 13b of the tray gear 13 engage each other, the cam slider 15 moves further in the +X direction by the rotation of the smaller gear portion 13b of the tray gear 13. When the cam slider 15 further moves in the +X direction, the rack portion 15d of the cam slider 15 and the smaller gear portion 13b of the tray gear 13 completely engage each other, and the cam slider 15 further moves in the +X direction by the rotation of the tray gear 13. By the movement of the cam slider 15 in the +X direction, the boss portion (for vertical movement) 51c of the traverse chassis 51 moves downward along the inclined groove portion 15k of the first cam groove 15a of the cam slider 15. With this, as shown in FIG. 15, the traverse chassis 51 swings downward (i.e., in the direction apart from the disk tray 12) about the swing shafts 51a and 51b, and the turntable 52 (FIG. 8) moves to the descend position, resisting the force of the attracting force from the clamper 18 side.

When the traverse chassis 51 moves downward, the boss portion 69a of the trigger plate 69 moves in the −Z direction along the vertical groove portion 11t (FIG. 9) of the guide groove 11f of the main chassis 11 via the inclined groove portion, because of the movement of the cam slider 15 in the +X direction and the movement of the traverse chassis 51 in the −Z direction. When the cam slider 15 moves in the +X direction by the rotation of the tray gear 13, the slide rack 58 further moves in the −Y direction because of the engagement between the groove portion 69b of the trigger plate 69 and the boss 58a, and the engagement between the slide rack 58 and the smaller gear portion 64a of the feed gear 64 is released.

In a state immediately before the traverse chassis 51 swings downward (in a state where the turntable 52 is on the ascent position), the cam slider 15 positions at the end of the movable range in the −X direction, and the boss portion 15c of the cam slider 15 engages the guide groove 12b (extending in the X direction) of the disk tray 12. Because of the engagement between the boss portion 15c and the guide groove 12b, the disk tray 12 is prevented from springing out in the −Y direction even when the external force or the like is applied.

<Transition From Turntable Vertically-Moving Operation To Disk Carrying Operation>

Figure 16:
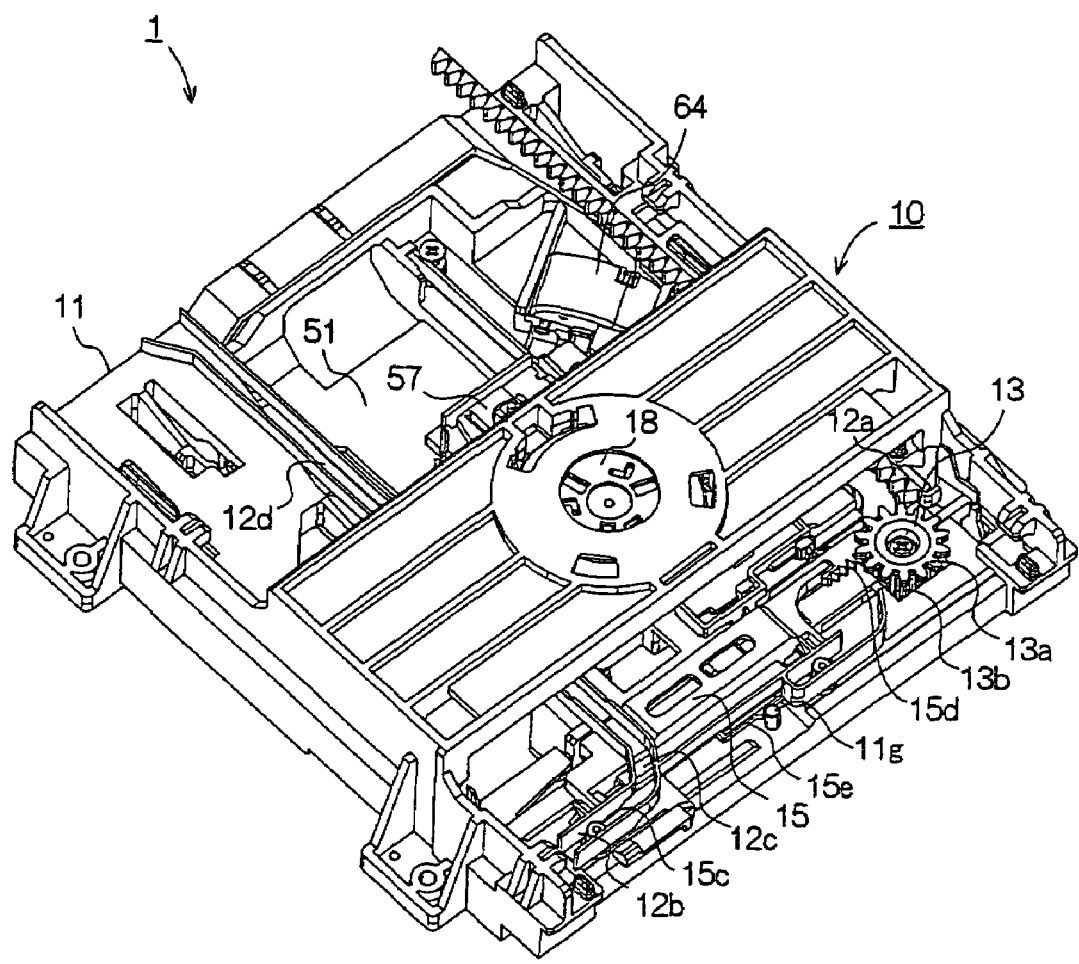
FIG. 16 is a perspective view of the optical disk device according to the embodiment of the present invention in a stage prior to a transition from a turntable vertically-moving operation to a disk carrying operation.
Figure 16:
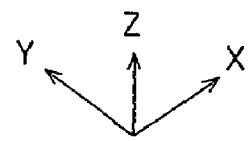
Figure 17:
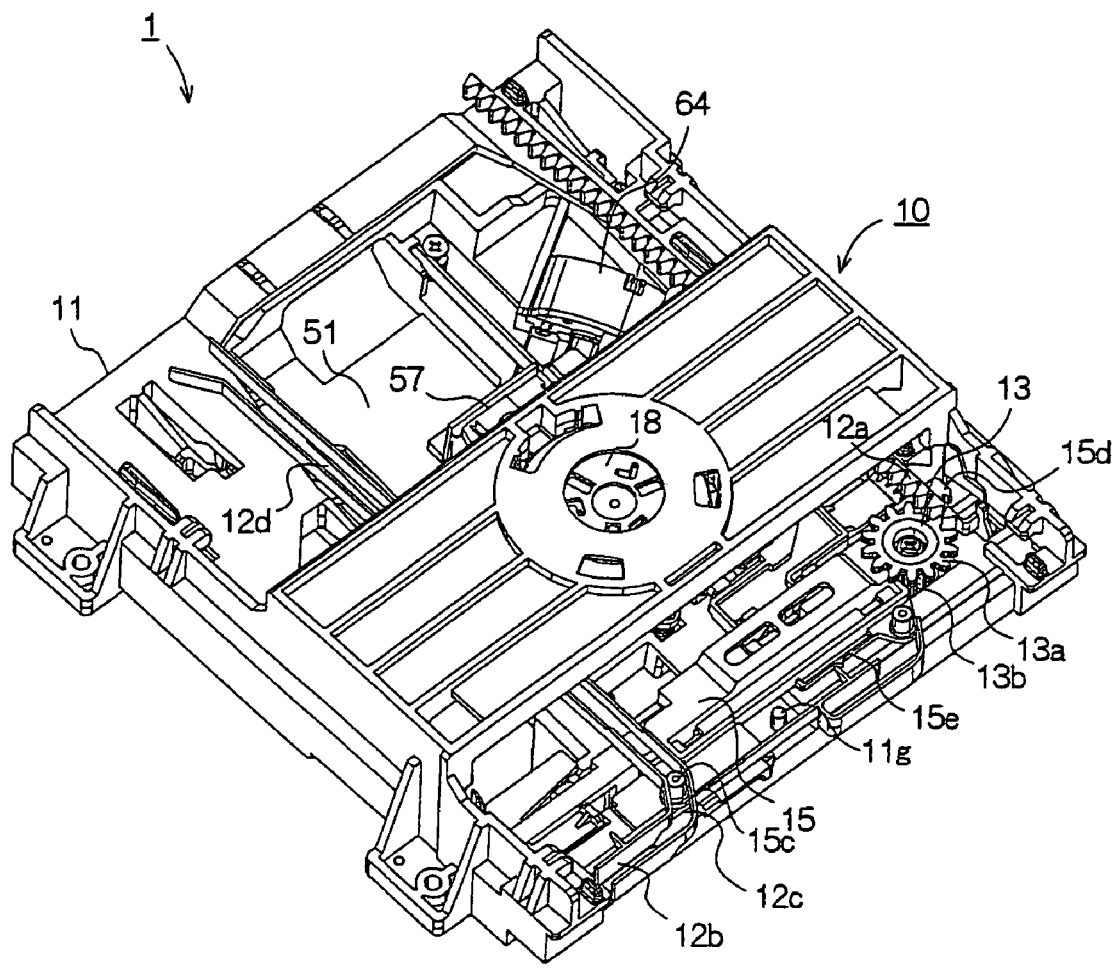
FIG. 17 is a perspective view of the optical disk device according to the embodiment of the present invention in a stage during the transition from the turntable vertically-moving operation to the disk carrying operation.
Figure 18:
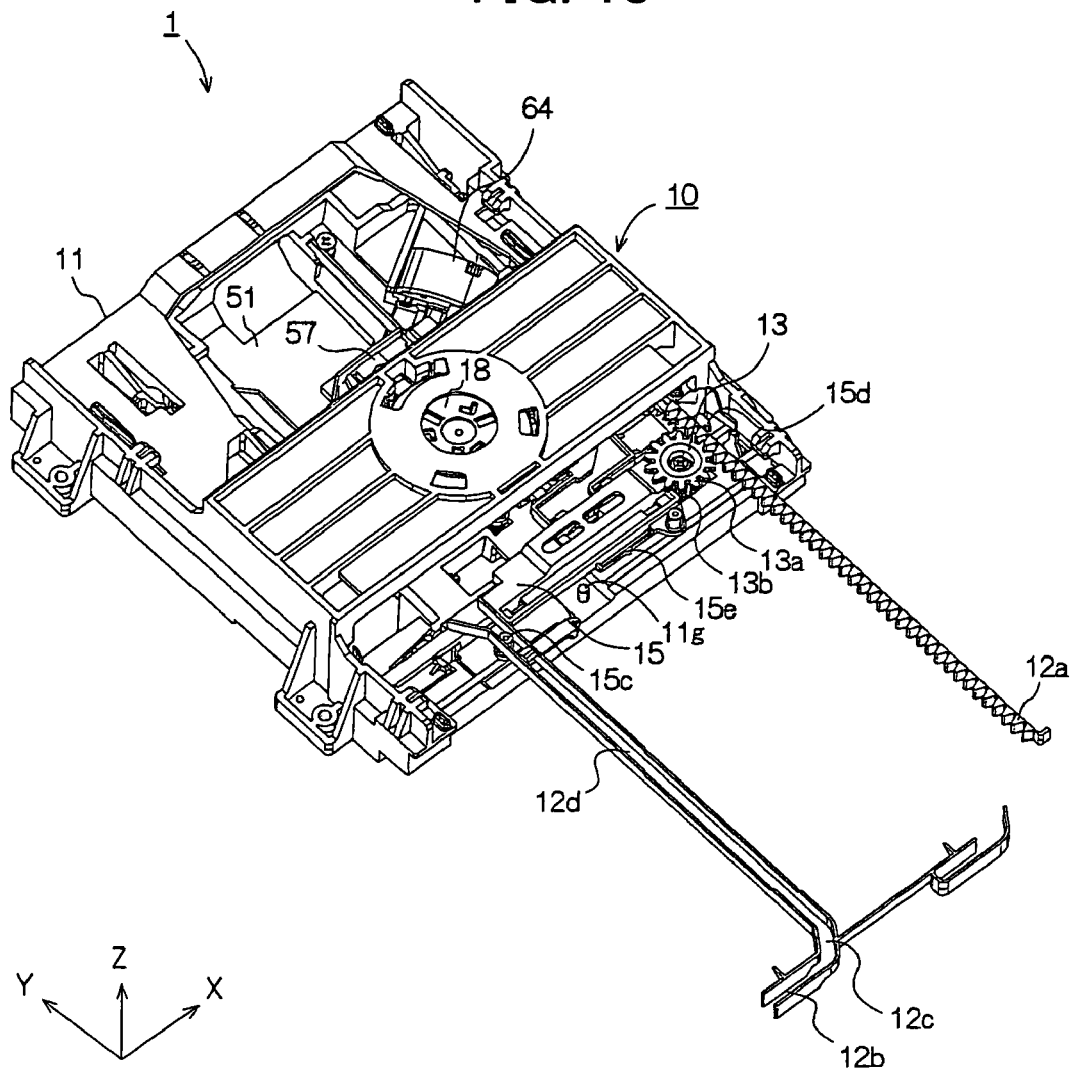
FIG. 18 is a perspective view of the optical disk device according to the embodiment of the present invention in a stage after the transition from the turntable vertically-moving operation to the disk carrying operation.

FIG. 16 is a perspective view of the optical disk device 1 before the transition from the turntable vertically-moving operation to the disk carrying operation. FIG. 17 is a perspective view of the optical disk device 1 after the transition from the turntable vertically-moving operation to the disk carrying operation. FIG. 18 is a perspective view of the optical disk device 1 performing the disk carrying operation. In FIGS. 16 through 18, the disk tray 12 is represented by the rack portion 12a and the guide grooves 12b, 12c and 12d.

When the cam slider 15 further moves in the +X direction by the rotation of the smaller gear portion 13b of the tray gear 13, the boss portion 15c of the cam slider 15 moves in the +X direction from the guide groove 12b to the guide groove 12c. Since the guide groove 12c is inclined with respect to the X direction, the movement of the boss portion 15c in the +X direction is converted into the force moving the disk tray 12 in the −Y direction. With this, the disk tray 12 moves in the −Y direction by a predetermined amount (i.e., moves in a direction protruding from the main chassis 11), and the larger gear portion 13a of the tray gear 13 and the rack portion 12a of the disk tray 12 engage each other. The rack portion 15d of the cam slider 15 further moves in the +X direction beyond the engaging position with the smaller gear portion 13b of the tray gear 13, and therefore the engagement between the rack portion 15d and the smaller gear portion 13b of the tray gear 13 is released.

While the cam slider 15 moves in the +X direction by the rotation of the smaller gear portion 13b of the tray gear 13, the boss (for vertical movement) 51c of the traverse chassis 51 moves horizontally in the lower horizontal groove portion 15m of the first cam groove 15a, and the boss portion 69a of the trigger plate 69 moves horizontally in the horizontal groove portion 15u of the second cam groove 15b, as shown in FIG. 15.

<Disk Carrying Operation>

After the rack portion 12a of the disk tray 12 and the larger gear portion 13a of the tray gear 13 engage each other, the motor 62 further rotates, and the tray gear 13 rotates to cause the disk tray 12 to move in the −Y direction. With this, as shown in FIG. 18, the disk tray 12 protrudes from the main chassis 11, and it becomes possible to place the optical disk on the placing surface 12f (FIG. 8) of the disk tray 12. After the user places the optical disk on the placing surface 12f of the disk tray 12, the motor 62 rotates in the direction opposite to the direction in the protruding operation of the disk tray 12, and the disk tray 12 moves in the +Y direction because of the engagement between the rack portion 12a and the larger gear portion 13a of the tray gear 13. With this, the disk tray 12 on which the optical disk is placed retracts into the main chassis 11, and the optical disk is stored at a predetermined storing position in the device.

While the disk tray 12 is moving in the Y direction, the boss portion 15c of the cam slider 15 engages the guide groove 12d (of the disk tray 12) extending in the Y direction, and therefore the position of the cam slider 15 in the X direction is restricted.

<Operations After Carrying-In Of Optical Disk>

After the disk tray 12 retracts into the main chassis 11, the turntable vertically-moving operation and the pickup feeding operation are sequentially performed as follows, and the information signal is recorded on or reproduced from the optical disk.

<Transition From Disk Carrying Operation To Turntable Vertically-Moving Operation>

When the disk tray 12 retracts to the predetermined position in the main chassis 11, the cam slider 15 moves in the −X direction because of the engagement between the inclined groove portion 12c of the disk tray 12 and the boss portion 15c of the cam slider 15, and the rack portion 15d of the cam slider 15 and the smaller gear portion 13b of the tray gear 13 again engage each other. At the same time, the engagement between the larger gear portion 13a of the tray gear 13 and the rack portion 12a of the disk tray 12 is released.

<Turntable Vertically-Moving Operation>

After the rack portion 15d of the cam slider 15 and the smaller gear portion 13b of the tray gear 13 again engage each other, the cam slider 15 moves in the −X direction by the rotation of the tray gear 13. In this state, because of the engagement between the boss portion (for vertical movement) 51c and the inclined groove portion 15k of the first groove 15a of the cam slider 15, the traverse chassis 51 swings upward about the swing shafts 51a and 51b as shown in FIG. 14, and the turntable 52 reaches the ascent position. The turntable 52 moves upward lifting the optical disk from the disk tray 12, and the clamper 18 is attracted to the turntable 52 because of the attraction force of the magnet 17 in the clamper 18, so that the optical disk is sandwiched between the clamper 18 and the turntable 52.

<Transition From Turntable Vertically-Moving Operation To Pickup Feeding Operation>

When the tray gear 13 further rotates, the rack portion 15d of the cam slider 15 further moves in the −X direction beyond the engaging position with the smaller gear portion 13b of the tray gear 13, and therefore the engagement between the rack portion 15d of the cam slider 15 and the smaller gear portion 13b of the tray 13 is released. In contrast, the trigger plate 69 moves in the −X direction together with the cam slider 15, the slide rack 58 moves in the +Y direction because of the engagement between the cam groove 69b of the trigger plate 69 and the boss portion 58a of the slide rack 58 as shown in FIG. 12. With this, the slide rack 58 and the smaller gear portion 64a of the feed gear 64 again engage each other. As a result, the optical pickup 57 becomes able to move in the +Y direction by the rotation of the motor 62.

<Pickup Feeding Operation And Recording/Reproducing Operation>

When the optical pickup 57 moves in the +Y direction by a predetermined amount, the pushing of the switch 72 by the switch-pushing portion 57b of the optical pickup 57 is released, and therefore it is detected that the optical pickup 57 moves in the +Y direction from the end of the movable range in the −Y direction.

In this state, the spindle motor 54 is driven to rotate, and the optical disk sandwiched between the clamper 18 and the turntable 52 rotates at a predetermined rotation speed. Further, the motor 62 rotates, and the optical pickup 57 moves in the Y direction via the feed gear 64 and the rack portion 57a, and the information signal is recorded on or produced from the data area of the optical disk.

In this connection, after the optical disk is stored, the position in which the optical pickup first reads the information signal is a push-releasing position in which the pushing of the switch 72 by the switch-pushing portion 57b of the optical pickup 57 is released. The push-releasing position is a position of the outer periphery side (preferably, slightly outer periphery side) with respect to the inner periphery of the data area. The optical pickup 57 reads the positioning information on the optical disk at the push-releasing position. According to the positioning information, the optical pickup 57 once moves to the end position of the inner periphery side of the data area of the optical disk. Based on this position, the movement of the optical pickup 57 during the recording or reproducing is controlled.

ADVANTAGES OF THE EMBODIMENT

Next, the advantages of the above described embodiment will be described.

On the transition from the optical pickup carrying operation to the turntable vertically-moving operation (FIG. 16 or the like), a tooth tip of the leading tooth (the tooth disposed at the end in the +X direction) of the rack portion 15d of the cam slider 15 engages a tooth bottom (FIG. 8) of the smaller gear portion 13b of the tray gear 13. Therefore, if the positioning relationship between the leading tooth of the rack portion 15d of the cam slider 15 and the smaller gear portion 13b of the tray gear 13 is not constant, the leading tooth of the rack portion 15d of the cam slider 15 may not reach, or may pass, the position facing the tooth bottom of the smaller gear portion 13b of the tray gear 13. As a result, the tooth tips may interfere with each other, and the transition from the optical pickup carrying operation to the turntable vertically-moving operation is not correctly performed. Therefore, at a position where the leading tooth of the rack portion 15d of the cam slider 15 engages the smaller gear portion 13b of the tray gear 13, the positioning relationship therebetween must be constant.

According to the embodiment, the number of teeth of the smaller gear portion 64a of the feed gear 64 is the same as the number of teeth of the intermediate gear portion 64c, and the number of teeth of the intermediate gear portion 64c is the same as number of teeth of the smaller gear portion 13b of the tray gear 13, and the rotation is so transmitted that the smaller gear portion 13b of the tray gear 13 rotates one turn when the intermediate gear portion 64c of the feed gear 64 rotates one turn (i.e., the ratio of the number of rotations of the intermediate gear portion 64c to the number of rotations of the smaller gear portion 13b is 1:1). Since the cam slider 15 is driven by the feed gear 64 in the initial stage in which the rack portion 15d of the cam slider 15 engages the smaller gear portion 13b of the tray gear 13, the position of the rack portion 15d of the moving rack 15 can be regarded as a phase of the intermediate gear 64c of the feed gear 64. Accordingly, the phase when the cam slider 15 starts engaging the tray gear 13 is primarily determined by design, and therefore it can be ensured that the tooth tip of the leading tooth of the rack portion 15d of the cam slider 15 engages the tooth bottom of the smaller gear portion 13b of the rotating tray gear 13. Thus, when the optical disk device 1 is assembled, the feed gear 64, the tray gear 13 and the intermediate gears 65 and 66 (FIG. 5) can be assembled without considering their respective phases.

Moreover, in the embodiment, the number of teeth of the intermediate gear portion 64c of the feed gear 64 is the same as the number of teeth of the tray gear 13, and the rotation is so transmitted that the ratio of the number of rotations of the intermediate gear portion 64c to the number of rotations of the tray gear 13 is 1:1. Accordingly, it becomes possible to accomplish the above configuration that keeps constant the relationship between the phase of the smaller gear portion 64a (engaging the rack portion 57a and the slide rack 58) and the phase of the tray gear 13, and therefore ease of the assembling can be enhanced. Furthermore, since the module of the intermediate gear portion 64c for driving the disk tray 12 is greater than the smaller gear portion 64a for driving the optical pickup, it becomes possible to enhance the strength of the teeth that belongs to the driving system for driving the disk tray 12. As a result, it becomes possible to prevent the breakage and deformation of the gear, even when the disk tray 12 (in a protruding state) after the ejection is completed is strongly pushed in.

On the transition from the turntable vertically-moving operation to the disk carrying operation (FIG. 17 or the like), when the larger gear portion 13a of the tray gear 13 and the rack portion 12a of the disk tray 12 start engaging, it is necessary that the engagement between the rack portion 15d of the cam slider 15 and the smaller gear portion 13b of the tray gear 13 is released. This is because, when the larger gear portion 13a of the tray gear 13 and the rack portion 12a of the disk tray 12 start engaging, if the rack portion 15d of the cam slider 15 does not reach the position in which the engagement between the rack portion 15d and the smaller gear portion 13b of the tray gear 13 is released, the rotation of the tray gear 13 causes the movement of the cam slider 15 as well as the disk tray 12. In such a case, due to the interference between the boss portion 15c and the guide grooves 12c and 12d or the like, the transition to the disk carrying operation is not correctly performed. Accordingly, the relationship between the phase of the smaller gear portion 13b of the tray gear 13 for driving the cam slider 15 and the phase of the larger gear portion 13a of the tray gear 13 for driving the disk tray 12 must be kept constant.

In the embodiment, the larger gear portion 13a of the tray 13 and the smaller gear portion 13b have the same number of teeth, but have the different module. With such an arrangement, it becomes possible to keep constant the relationship between the phase of the larger gear portion 13a and the phase of the smaller gear portion 13b, and therefore it becomes possible to correctly perform the transition from the turntable vertically-moving operation to the disk carrying operation.

Further, in the embodiment, the moving speed of the disk tray 12 is faster than the moving speed of the optical pickup 57 by a product (M1×M2) of a ratio M1 of the module of the intermediate gear portion 64c to the smaller gear portion 64a of the feed gear 64 and a ratio M2 of the module of the larger gear portion 13a to the smaller gear portion 13b of the tray gear 13. With this, the moving amount of the disk tray 12 corresponding to one rotation of the motor 62 is approximately double the moving amount of the optical pickup 57 corresponding to one rotation of the motor 62. As an example, the moving amount of the disk tray 12 corresponding to one rotation of the motor 62 is 2 mm, and the moving amount of the optical pick up 57 is 1 mm. As a result, it becomes possible to precisely determine the position of the optical pickup 57, and to accomplish a high speed movement of the disk tray 12 to thereby shorten the time for carrying the optical disk. In addition, the module of the larger gear portion 13a (for the disk carrying) can be relatively large, and therefore the strength of the teeth can be enhanced. Therefore, even when the protruded disk tray 12 is pushed in by the external force, the breakage or elastic deformation of the teeth hardly occur, and the situation such as the deviation of the larger gear portion 13a and the rack portion 12a from the correct engaging state by several teeth hardly occur. Thus, it becomes possible to accomplish the optical disk device having reliability.

Further, in the embodiment, the trigger plate 69 moves in conjunction with the slide rack 58, and the trigger plate 69 causes the cam slider 15 to move to the position in which the rack portion 15d engages the tray gear 13, with the result that the transition from the pickup feeding operation to the turntable vertically-moving operation can be smoothly performed.

Moreover, in the embodiment, by the movement of the cam slider 15 in the +X direction from the state where the cam slider 15 engages the smaller gear portion 13b of the tray gear 13, the disk tray 12 moves (protrudes) in the −Y direction by a predetermined amount because of the engagement between the boss portion 15c and the guide groove 12c, so that the rack 12a of the disk tray 12 and the larger gear portion 13a of the tray gear 13 engage each other. Therefore, the transition from the vertically-moving operation of the turntable 52 to the disk carrying operation can be smoothly performed.

Further, in the embodiment, the worm gear 63 is press-fit on the output shaft of the motor 62, and the motor 62 and the worm gear 63 are inclined at an angle corresponding to the lead angle of the worm gear 63 so that the worm gear 63 engages the larger gear portion 64b of the feed gear 64. Therefore, the following advantages are obtained.

On the assumption that a spur gear (referred to as a motor shaft spur gear) is fixed to the output shaft of the motor, and this motor shaft spur gear engages another spur gear (referred to as a power transmission spur gear) for the power transmission, a pitch error of the teeth between the motor shaft spur gear and the power transmission spur gear causes a tap noise to be generated, since the number of rotations of the motor reaches several thousands per minute in the case of high speed searching of the data on the optical disk. In order to reduce the tap noise, it is necessary to use power transmission spur gear made of relatively soft material such as nylon. However, the gear made of nylon costs approximately five times the gear made of plastic (as a major example, polyacetal).

In contrast, in the embodiment, even when the number of rotations of the motor 62 reaches several thousands per minute in the above described searching, the number of rotations of the feed gear 64 can be reduced to approximately several hundreds per minutes because of a reduction effect of the worm gear 63, and therefore it becomes possible to reduce the harsh tap noise caused by the pitch error of the teeth. Accordingly, it is not necessary to use an expensive material such as nylon as the feed gear 64, and it is possible to accomplish a silent pickup feeding operation using a relatively inexpensive material such as plastic.

Moreover, a helical gear is generally used as a worm wheel engaging the worm gear. However, since the worm gear 63 is inclined at an angle corresponding to the lead angle of the worm gear 63, it becomes possible to use a spur gear as the larger gear portion (the worm wheel) 64b of the feed gear 64. In the case where the helical gear is made by molding of a plastic material, there are undercuts in the direction in which a mold is opened, and therefore it is necessary to provide a rotation mechanism operable in synchronization with the opening of the mold, and the structure of the mold becomes complicated. If the structure of the mold becomes complicated, the cost for producing the mold becomes expensive and the cost is reflected in the unit cost of the component, and therefore the cost of the component increases. In contrast, by using a spur gear as the larger gear portion 64b of the feed gear 64, it becomes possible to reduce the cost of the component, compared with the case in which the larger gear portion 64b is made of a helical gear.

The configuration in which the worm gear 63 fixed to the motor 62 is inclined at an angle corresponding to the lead angle of the worm gear 63 and engages the spur gear is not limited to the above described optical disk device that performs the pickup feeding operation, the turntable vertically-moving operation and the disk carrying operation by one driving source, but can also be applied to an optical disk device having at least a mechanism for pickup feeding operation.

Moreover, in the above description, although the direction of the movement of the turntable 52 is described to be a vertical direction, this is for convenience of explanation. It is also possible to have a configuration in which the turn table 52 moves, for example, in a horizontal direction (i.e., the configuration in which the Z direction is a horizontal direction and the X direction is a vertical direction in FIG. 1).

The invention claimed is:

1. An optical disk device comprising:
   a main chassis;
   a disk tray movable in a direction protruding from said main chassis and in the opposite direction so as to carry said optical disk in or out of said main chassis;
   a turntable that rotates said optical disk carried-in by said disk tray;
   a traverse chassis that supports said turntable, said traverse chassis being supported by said main chassis so that said traverse chassis is swingable between a holding position in which said turntable is able to hold said optical disk and a retracting position retracting from said holding position;
   an optical pickup that performs recording or reproducing of a signal on said optical disk rotated by said turntable;
   a common motor that generates a driving force for feeding said optical pickup, for swinging said traverse chassis, and for moving said disk tray;
   a first gear that rotates by a driving force of said motor;
   a second gear that rotates by transmission of rotation from said first gear;
   a rack portion integrally formed with said optical pickup, said rack portion engaging said first gear to move, an engagement between said rack portion and said first gear being released when said rack portion reaches a predetermined engagement-releasing area;
   a slide rack relatively movable with respect to said rack portion, said slide rack engaging said first gear to move;
   a slider member having an engaging portion capable of engaging said second gear and a cam portion that causes said traverse chassis to swing between said holding position and said retracting position; and
   a trigger member that moves in conjunction with said slide rack in a state where said engagement between said rack portion and said first gear is released, so as to move said slider member to a position in which said slider member engages said second gear,
   wherein said first gear and said second gear have the same number of teeth, and the rotation is transmitted from said first gear to said second gear so that the ratio of the number of rotations of said first gear to the number of rotations of said second gear is 1:1.

2. The optical disk device according to claim 1, wherein said first gear includes a driving gear portion capable of engaging said rack portion of said optical pickup and said slide rack, and a transmission gear portion whose number of teeth is the same as said driving gear portion and whose module is greater than said driving gear portion; and Wherein said second gear has the same number of teeth as said transmission gear portion of said first gear, and the rotation is transmitted from said transmission gear portion to said second gear so that the ratio of the number of rotations of said transmission gear portion to the number of rotations of said second gear is 1:1.

3. The optical disk device according to claim 1, wherein said second gear includes a smaller gear portion capable of engaging said engaging portion of said slider member, and a larger gear portion whose number of teeth is the same as said smaller gear portion and whose module is greater than said smaller gear portion; and wherein said rack portion mounted on said disk tray engages said larger gear portion of said second gear.

4. The optical disk device according to claim 3, wherein said disk tray has an engaging groove that engages a projection formed on said slider member, and wherein, when said slider member moves in one direction in a state where said engaging portion of said slider member engages said smaller gear portion of said second gear, said disk tray moves because of the engagement between said projection and said engaging groove, so that said rack portion of said disk tray engages said larger gear portion of said second gear.

5. The optical disk device according to claim 2, wherein said first gear includes a larger gear portion in addition to said driving gear portion and said transmission gear portion, said larger gear portion having a pitch circle larger than any of pitch circles of said driving gear portion and said transmission gear portion, wherein said larger gear portion is composed of a spur gear, and wherein a worm gear is fixed to an output shaft of said motor, said worm gear engaging said larger gear portion, and a rotation axis of said worm gear is inclined with respect to a rotation axis of said larger gear portion at an angle corresponding to a lead angle of said worm gear.

6. An optical disk device comprising:

an optical pickup that performs recording or reproducing of a signal on an optical disk;

a pickup driving mechanism including a rack portion integrally formed with said optical pickup, said pickup driving mechanism causes said optical pickup to move between an outer peripheral position and an inner peripheral position of said optical disk;

a motor for driving said pickup driving mechanism;

a worm gear fixed to an output shaft of said motor; and a gear having a smaller gear portion that engages said rack portion, and a larger gear portion coaxial with said smaller gear portion and engaging said worm gear, wherein said larger gear portion is composed of a spur gear, and a rotation axis of said worm gear is inclined with respect to a rotation axis of said larger gear portion at an angle corresponding to a lead angle of said worm gear.

* * * * *